US010769158B2

(12) United States Patent
Brost et al.

(10) Patent No.: US 10,769,158 B2
(45) Date of Patent: Sep. 8, 2020

(54) COMPUTER PROCESSING THROUGH DISTANCE-BASED QUALITY SCORE METHOD IN GEOSPATIAL-TEMPORAL SEMANTIC GRAPHS

(71) Applicant: National Technology & Engineering Solutions of Sandia, LLC, Albuquerque, NM (US)

(72) Inventors: Randolph Brost, Albuquerque, NM (US); Diane Woodbridge, Corte Madera, CA (US)

(73) Assignee: National Technology & Engineering Solutions od Sandia, LLC, Albuquerque, NM (US)

( * ) Notice: Subject to any disclaimer, the term of this patent is extended or adjusted under 35 U.S.C. 154(b) by 303 days.

(21) Appl. No.: 15/980,578

(22) Filed: May 15, 2018

(65) Prior Publication Data
US 2019/0354597 A1 Nov. 21, 2019

(51) Int. Cl.
G06F 17/30 (2006.01)
G06F 16/2457 (2019.01)
G06F 16/248 (2019.01)
G06F 16/901 (2019.01)

(52) U.S. Cl.
CPC ...... *G06F 16/24578* (2019.01); *G06F 16/248* (2019.01); *G06F 16/9024* (2019.01)

(58) Field of Classification Search
None
See application file for complete search history.

(56) References Cited

U.S. PATENT DOCUMENTS

| 9,727,976 | B1 | 8/2017 | Perkins et al. | |
| 9,911,039 | B1 | 3/2018 | Brost et al. | |
| 2005/0265582 | A1* | 12/2005 | Buehler | G06K 9/00335 382/103 |
| 2013/0063489 | A1* | 3/2013 | Hourie | G06T 17/05 345/643 |

(Continued)

OTHER PUBLICATIONS

Brost, R.C. et al., "Geospatial-Temporal Semantic Graphs for Automated Wide-Area Search", Sandia National Laboratories Report SAND2017-8687, Aug. 2017, 150 pages.

(Continued)

*Primary Examiner* — Hung D Le
(74) *Attorney, Agent, or Firm* — Yee & Associates, P.C.

(57) ABSTRACT

A computer-implemented method of improving processing of overhead image data by a processor using a distance-based quality score in a geospatial-temporal semantic graph. An allowable range for each attribute in the subgraph search template is defined. For each match in a comparison, attribute values of each match element are compared against the preferred range and the allowable range to compute a corresponding distance of each match attribute from the subgraph search template. A corresponding overall match quality score is determined for each match from the subgraph search template, wherein determining the corresponding overall match qualities is performed using a corresponding required quality score and a corresponding optional quality score. All corresponding overall match quality scores are sorted into an ordered list and then displayed.

20 Claims, 12 Drawing Sheets

(56) References Cited

U.S. PATENT DOCUMENTS

| | | | | |
|---|---|---|---|---|
| 2014/0279927 | A1* | 9/2014 | Constantinescu ... | G06F 16/1748 |
| | | | | 707/679 |
| 2014/0357295 | A1* | 12/2014 | Skomra .............. | G06Q 10/0833 |
| | | | | 455/456.1 |
| 2016/0241864 | A1* | 8/2016 | Loyd ........................ | G06F 16/29 |
| 2017/0293635 | A1* | 10/2017 | Peterson ................. | G06F 16/29 |
| 2018/0373701 | A1* | 12/2018 | McAteer ................. | G06F 40/30 |
| 2019/0130640 | A1* | 5/2019 | Barre ..................... | G06T 11/60 |

OTHER PUBLICATIONS

Stracuzzi et al., "Computing Quality Scores and Uncertainty for Approximate Pattern Matching in Geospatial Semantic Graphs," Statistical Analysis and Data Mining 8(5-6):340-352, Oct./Dec. 2015.

Stracuzzi, D.J. et al. ,"Preliminary Results on Uncertainty Quantification for Pattern Analytics", Sandia National Laboratories Report SAND2015-8099, Sep. 2015, 53 pages.

Brost, R.C. et al., "A Computational Framework for Ontologically Storing and Analyzing Very Large Overhead Image Sets", 3rd ACM SIGSPATIAL International Workshop on Analytics for Big Geospatial Data (BigSpatial), Dallas, TX, 2014, 10 pages.

Brost, R.C. et al., "Computing Quality Scores and Uncertainty for Approximate Pattern Matching in Geospatial Semantic Graphs", Poster in 2014 Conference on Data Analysis (CoDA), Mar. 2014, 1 page.

McLendon III, W.C. et al., "Path Network Recovery Using Remote Sensing Data and Geospatial-Temporal Semantic Graphs." Sandia National Laboratories Report SAND2016-4557, May 2016, 55 pages.

Brost, R.C. et al., "Activity Analysis with Geospatial-Temporal Semantic Graphs", Sandia National Laboratories Report SAND2015-10455, Dec. 2015, 83 pages.

Brost, R.C. et al. "Geospatial-Temporal Semantic Graphs for Remote Sensing Data Analysis"., Presentation given to DigitalGlobe, Jul. 23, 2015, SAND 2015-5935 PE, 150 pages.

\* cited by examiner

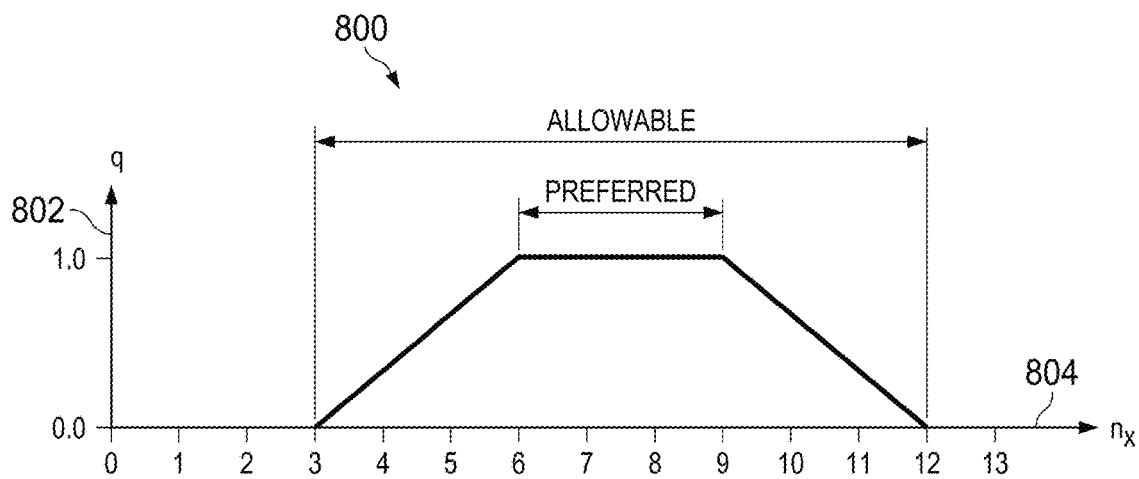
FIG. 8
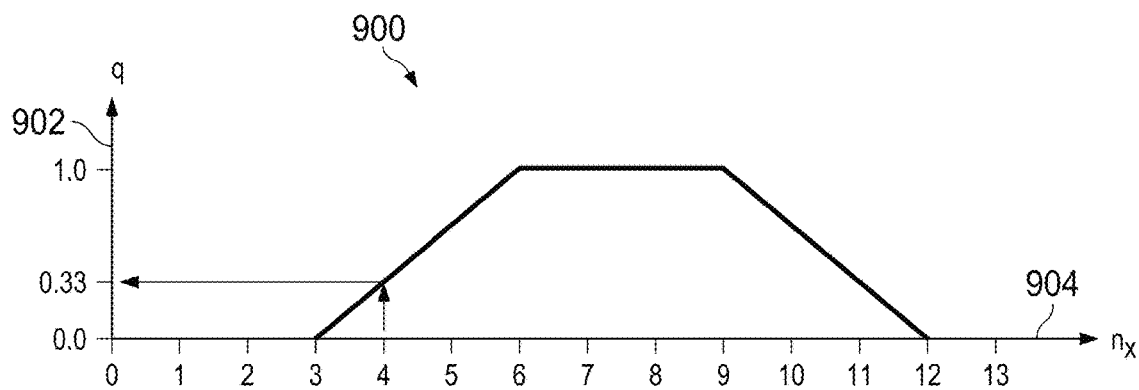
FIG. 9
FIG. 10
| $n_x$ | $q_{optional.X}$ |
|---|---|
| 1 | - |
| 2 | - |
| 3 | - |
| 4 | 0.33 |
| 5 | 0.67 |
| 6 | 1.00 |
| 7 | 1.00 |
| 8 | 1.00 |
| 9 | 1.00 |
| 10 | 0.67 |
| 11 | 0.33 |
| 12 | 0.00 |
FIG. 11
| $n_x$ | $q_{optional.X}$ | $w_j$ |
|---|---|---|
| 1 | - | - |
| 2 | - | - |
| 3 | - | - |
| 4 | 0.33 | 0.33 |
| 5 | 0.67 | 0.34 |
| 6 | 1.00 | 0.33 |
| 7 | 1.00 | 0 |
| 8 | 1.00 | 0 |
| 9 | 1.00 | 0 |
| 10 | 0.67 | -0.33 |
| 11 | 0.33 | -0.34 |
| 12 | 0.00 | -0.33 |

COMPUTER PROCESSING THROUGH DISTANCE-BASED QUALITY SCORE METHOD IN GEOSPATIAL-TEMPORAL SEMANTIC GRAPHS

STATEMENT OF GOVERNMENT INTEREST

This invention was made with Government support under Contract No. DE-NA0003525 awarded by the United States Department of Energy/National Nuclear Security Administration. The U.S. Government has certain rights in the invention.

BACKGROUND INFORMATION

1. Field

The present disclosure relates to methods and devices for improving computers by using a distance-based quality score method in geospatial-temporal semantic graphs.

2. Background

A geospatial-temporal semantic graph represents objects found in remote sensing and other data. The geospatial-temporal semantic graph has attributes describing the properties of the graph, including geospatial and temporal extent.

A problem in using these graphs to find objects of interest is having too many matches without knowing which ones are most similar to a template. This problem arises solely in a computer, as a human being can simply look at a picture and pick out the correctly matching object of interest. Thus, improvements are needed in using computers to find objects of interest in geospatial-temporal semantic graphs.

SUMMARY

The illustrative embodiments provide for a computer-implemented method of improving processing of overhead image data by a processor using a distance-based quality score in a geospatial-temporal semantic graph. The computer-implemented method includes specifying, by the processor, a subgraph search template in the geospatial-temporal semantic graph, wherein the subgraph search template includes nodes and edges, and wherein the nodes include both a required set of nodes and an optional set of nodes. The computer-implemented method also includes defining, by the processor, an allowable range for each attribute in the subgraph search template. The computer-implemented method also includes defining, by the processor, a preferred range for each attribute in the subgraph search template. The computer-implemented method also includes executing, by the processor, a search of the geospatial-temporal semantic graph using the allowable range. The computer-implemented method also includes comparing, by the processor, for each match, attribute values of each match element against the preferred range and the allowable range to compute a corresponding distance of each match attribute from the subgraph search template. The computer-implemented method also includes converting, by the processor, the corresponding distance to a corresponding required quality score for each match element in the required set of nodes, wherein each corresponding required quality score comprises a corresponding first distance-based quality score. The computer-implemented method also includes converting, by the processor, the corresponding distance to a corresponding optional quality score for each match element in the optional set of nodes, wherein each corresponding optional quality score comprises a corresponding second distance-based quality score. The computer-implemented method also includes determining, by the processor, a corresponding overall match quality score for each match from the subgraph search template, wherein determining the corresponding overall match qualities is performed using the corresponding required quality score and the corresponding optional quality score. The computer-implemented method also includes sorting, by the processor, all corresponding overall match quality scores into an ordered list. The computer-implemented method also includes displaying, on a display device, the ordered list.

The illustrative embodiments also contemplate a computer including a processor and a computer usable program code storing program code which, when executed by the processor, performs the above computer-implemented method. The illustrative embodiments also contemplate a non-transitory computer recordable storage medium storing program code, which when executed by a processor, performs the above computer-implemented method. Other illustrative embodiments are also possible, as described elsewhere herein.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is a graph illustrating a cardinality quality specification, in accordance with an illustrative embodiment;

FIG. 9 is a graph illustrating a cardinality quality lookup, in accordance with an illustrative embodiment;

FIG. 10 is a table illustrating a relation of values of $n_x$ versus $q_{optional\_X}$, in accordance with an illustrative embodiment;

FIG. 11 is a table illustrating a relation of values of $n_x$ versus a $q_{optional\_X}$ with weights $w_j$, in accordance with an illustrative embodiment;

DETAILED DESCRIPTION

Figure 1:
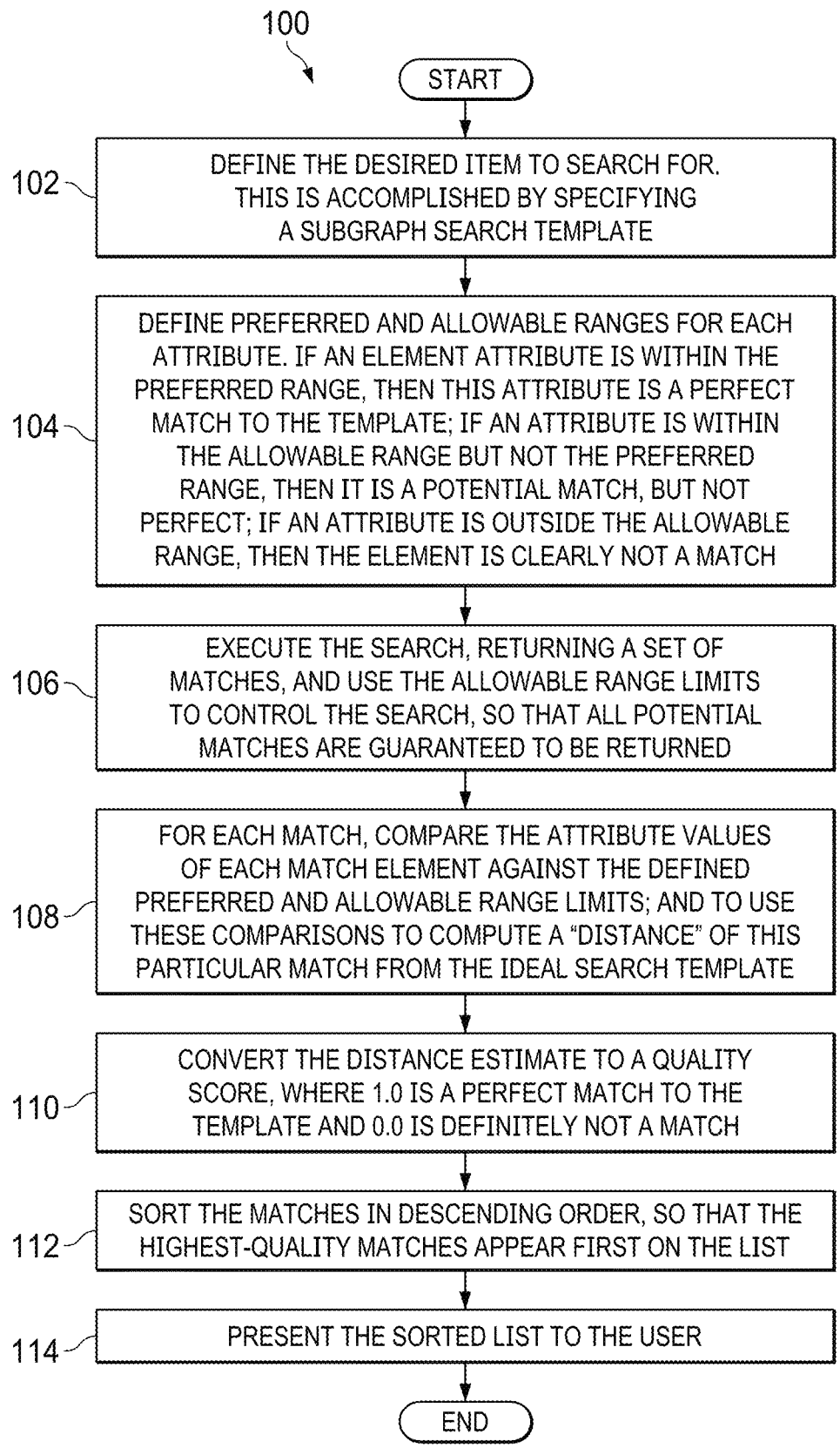
FIG. 1 illustrates a flowchart of a method for performing distance-based quality scores in a geospatial temporal graph, in accordance with an illustrative embodiment.

The illustrative embodiments recognize and take into account that overhead imagery is collected routinely from both aerial and satellite platforms. This imagery provides a rich source of information for answering a wide range of questions. For example, it is desirable to find all instances of oil tank farms near bodies of water, for inspection to verify that their containment berms are adequate to protect the adjacent water supply. In another example, a home buyer may desire to determine where good candidate neighborhoods exist which have desirable features, such as trees, schools, and hospitals.

Overhead imagery can help answer such questions, but the challenge results from the huge size of the images covering vast land areas. It can be very time consuming to manually search wide areas for items of specific interest, and this issue is even more difficult when the task requires identification of change across multiple images over time.

One way to address this issue is to search geospatial-temporal graphs for the purpose of identifying objects of interest. However, the illustrative embodiments recognize and take into account that currently computers are not adequate for searching geospatial-temporal graphs for the purpose of identifying objects of interest. Specifically, a problem exists in using these graphs to have computers find objects of interest; namely, there can be too many matches without knowing which ones are most similar to a given search template. The illustrative embodiments provide a solution to this issue and enable computers to perform this type of computer-related activity. The illustrative embodiments are only useful in computers, as a human being can recognize desired objects simply by looking at an image.

The illustrative embodiments also recognize and take into account that there has been longstanding interest in the problem of ranking search results, especially in the domain of internet web searches. However, the illustrative embodiments also recognize and take into account that this problem has not yet been solved in the area of processing geospatial-temporal graphs, especially considering matches with varying topology. This feature is not shown in the Stracuzzi et al. paper.

The illustrative embodiments also recognize and take into account that geospatial-temporal semantic graphs represent objects found in remote sensing and other data, with attributes describing their properties including geospatial and temporal extent and supporting searches on the geospatial-temporal semantic graph. The illustrative embodiments described herein explain how the graph can represent both durable and ephemeral objects, and the spatiotemporal relationships between them. Further, the illustrative embodiments explain the graph algorithm for efficiently searching the graph for patterns of interest that can be represented with hub-and-spoke star templates, and also the heterogeneous complex search algorithm for finding a closely-coupled collection of related components, and also how multi-step search algorithms can enhance search capability and efficiency.

The illustrative embodiments recognize and take into account that the distance-based quality score method described herein provides a means for sorting matches to geospatial-temporal semantic graph searches, so that better matches appear first. The illustrative embodiments are flexible and tolerant of imperfect matches, and support discrimination between required and optional template components. An extension, the illustrative embodiments allow estimation of a match quality variation range associated with each score.

The illustrative embodiments look for patterns represented as a search template which may specify objects, ground cover, distances, and relationships including a star graph and a heterogeneous complex. A search template includes one or more template nodes, each of which has an associated set of attribute ranges, each of which defines the range of allowable values that a result node attribute must fall within in order for the result node to qualify as a candidate match node. The search template may also include template edges connecting template nodes, with associated attributes such as distance, time, etc, and an associated range of allowable values for each template edge attribute. The search template may also include a range of preferred values for node or edge attributes. The ensemble of search nodes, search edges, their associated attributes, and the allowable and preferred ranges of attribute values combine to form the overall search template.

The illustrative embodiments then use a search algorithm to search the graph for matches to the template. A variety of search algorithms are possible. One example hub-and-spoke star search algorithm first finds all graph nodes that match a template node, with attributes that fall within the allowable range of the corresponding template node attribute allowable range, then finds all graph edges connecting graph match nodes corresponding to template graph edges, where the graph edge attributes fall within the corresponding template edge allowable range, and then finds and returns all hub-and-spoke star graph ensembles that match the template node and edge topology. A second example heterogenous complex algorithm begins by using similar methods to find all matching graph nodes and edges, and then uses a connected component search algorithm to identify and return all connected components of the resulting match nodes and edges, where each connected component is a separate resulting match.

Depending on input data content and how a template is designed, the searches can return many matches. However, having too many matches without knowing which ones are most similar to the template can hurt the usability of the system. Instead, the illustrative embodiments return matches in sorted order, so that matches most similar to the user's specified search criteria appear first. Thus, the illustrative embodiments enable a user's workload to be significantly reduced. Stated differently, the illustrative embodiments define a method to measure the quality of a match.

The illustrative embodiments define this method using quality scoring. The method for performing quality scoring is particularly presented with respect to FIG. 6 through FIG. 15.

FIG. 1 illustrates a flowchart of a method for performing distance-based quality scores in a geospatial temporal graph, in accordance with an illustrative embodiment. Method 100 may be implemented in a data processing system, such as data processing system 1600 of FIG. 16. Method 100 represents one method for using distance-based quality scores in a geospatial-temporal semantic graph.

Method 100 recognizes that, in a geospatial-temporal search template, some elements are required while others are optional. It is possible that either the set of required or optional elements is empty; that is, a template may comprise either all required elements, or all optional elements, or a mixture of both. A match that includes all required and optional elements, and where all parameters are within the preferred range, would receive a quality score of 1.0. Where no match at all exists, a quality score of 0.0 is assigned.

Method 100 may begin by defining the desired item to search for (operation 102). This operation may be accomplished by specifying a subgraph search template. Note that the template subgraph is composed of nodes and edges. These nodes and edges may be referred to as elements of the subgraph. Each element has associated defining parameters; for example, the search template might include a graph node corresponding with area specified to be within certain bounds. These element-defining parameters may be termed "attributes."

Method 100 also includes defining preferred and allowable ranges for each attribute; if an element attribute is within the preferred range, then this attribute is a perfect match to the template; if an attribute is within the allowable range but not the preferred range, then it is a potential match, but not perfect; if an attribute is outside the allowable range, then the element is clearly not a match (operation 104). Note that quality of match to what the user intends is not performed, but rather to a match to a provided template. Method 100 also includes executing the search, returning a set of matches; and to use the allowable range limits to control the search, so that all potential matches are guaranteed to be returned (operation 106).

Method 100 also includes, for each match, comparing the attribute values of each match element against the defined preferred and allowable range limits; and to use these comparisons to compute a "distance" of this particular match from the ideal search template (operation 108). Method 100 also includes converting the distance estimate to a quality score, where 1.0 is a perfect match to the template and 0.0 is definitely not a match (operation 110).

Method 100 also includes sorting the matches in descending order, so that the highest-quality matches appear first on the list (operation 112). Method 100 also includes presenting the sorted list to the user (operation 114). In one illustrative embodiment, the method may terminate thereafter.

Similar to familiar Internet search engines, the best search result will appear first on the list, with subsequent entries gradually decreasing in match quality. In the distance-based quality score method, the quality for a given match is computed by first estimating the "distance" of the match from the ideal template. This distance is then converted to a quality score over the range of (0, 1] using the following formula:

$$\text{Quality} = 1/(1+\text{Distance}) \quad \text{(Equation Z)}$$

As deviations from ideal accumulate, this quality score function decreases at a monotonic, intuitive rate. The search algorithms of the illustrative embodiments allow elements to be required or optional, so the quality score method of the illustrative embodiments consider this. If a required element is missing, then the quality score should drop to near zero. However, if optional elements are missing, the quality score should decrease but not catastrophically. This result is achieved by careful design of the quality calculation method. This design is described in detail with respect to FIG. 6 through FIG. 15.

Figure 2A:
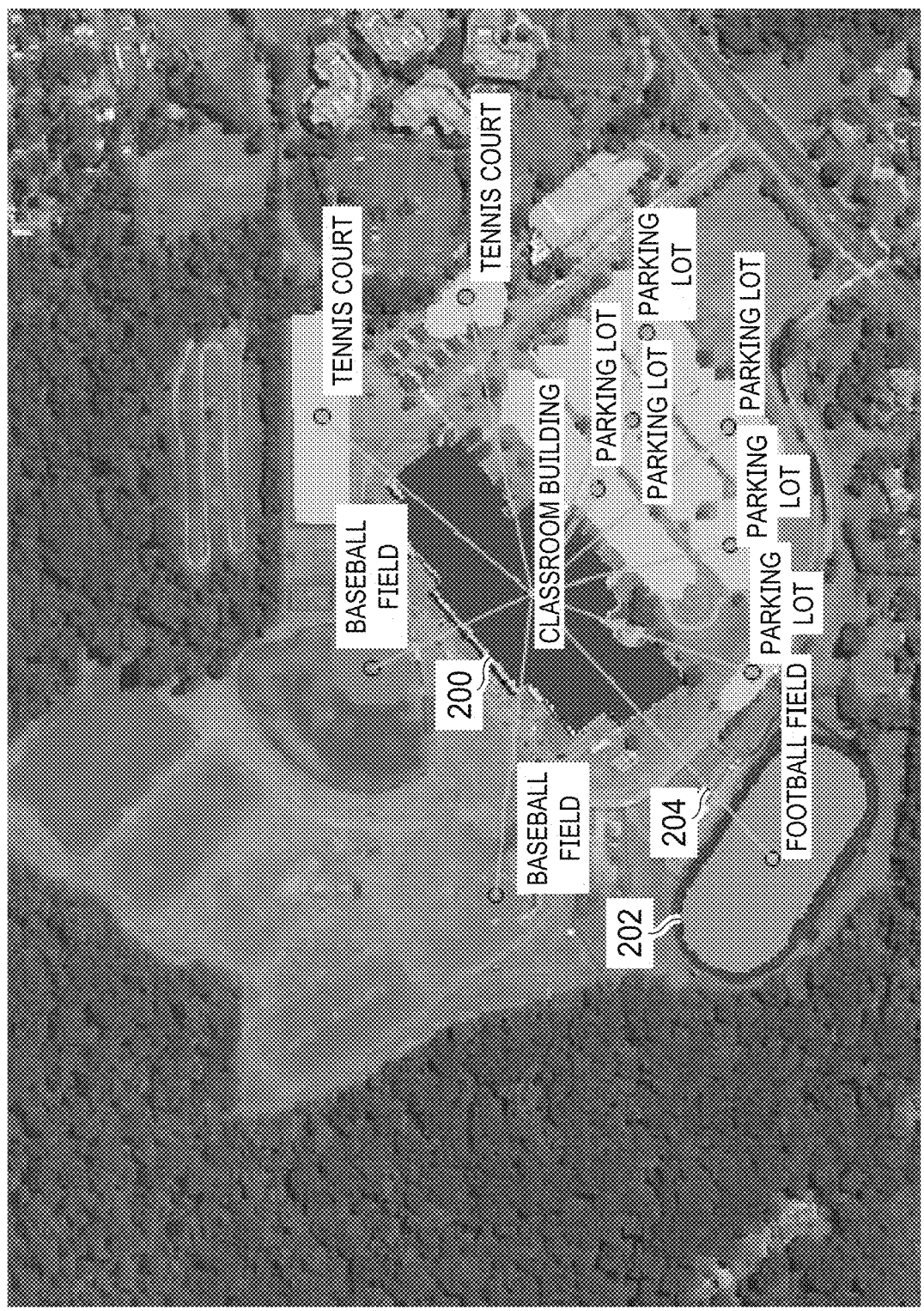
FIGS. 2A and 2B are an example aerial photograph of a school campus, including distance matches, in accordance with an illustrative embodiment.
Figure 2B:
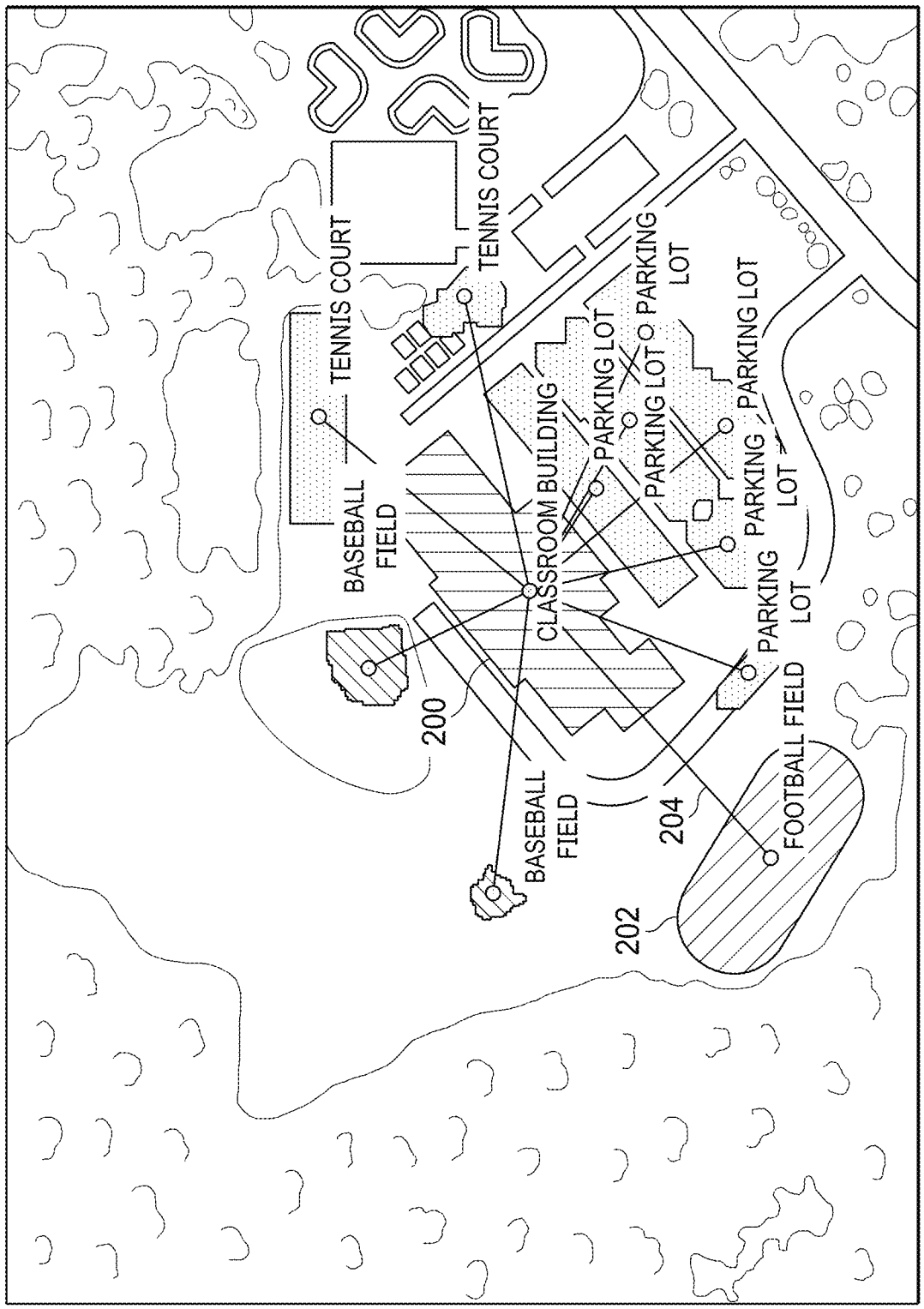

FIGS. 2A and 2B are an example aerial photograph of a school campus, including match elements, in accordance with an illustrative embodiment. FIGS. 2A and 2B are used, in part, to exemplify method 100 shown in FIG. 1.

Public high schools in a given county typically have a classroom building, parking lots, a football field, and sometimes baseball fields and tennis courts. In this example is defined a search template that describes each node element using its attributes including land cover type (e.g. building, grass, paved, or dirt) and various parameters that are functions of the node's size and shape. Also defined are template edge elements with attributes corresponding to the distance between two nodes. The developed template returns a candidate high school such as shown in FIGS. 2A and 2B.

As can be seen, FIGS. 2A and 2B can be characterized in part by features nearby a classroom building 200. Thus, for example, football field 202 may be located near classroom building 200, as shown by line 204. Additional nearby areas of interest are shown, as presented in FIGS. 2A and 2B. The distance thresholds are evaluated by computing the minimum distance between two shapes, not the distance between center points or graph node labels.

Figure 3:
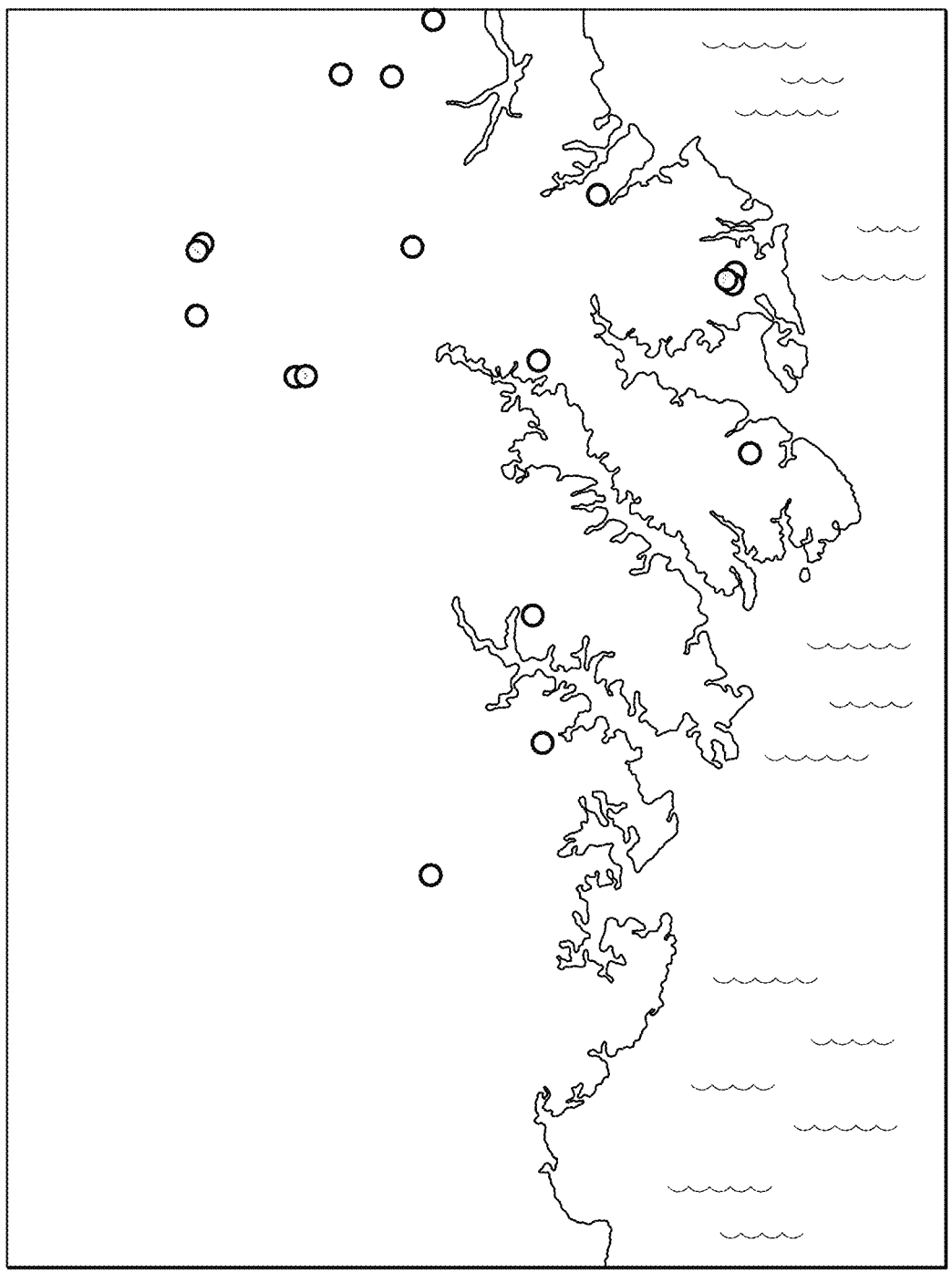
FIG. 3 is an example of returned school matches with respect to FIG. 2, in accordance with an illustrative embodiment.

FIG. 3 is an example showing locations of returned school matches with respect to FIGS. 2A and 2B found over a wide area, in accordance with an illustrative embodiment. FIG. 3 is used, in part, to exemplify method 100 shown in FIG. 1.

Applying the distance-based quality score method allows sorting of matches based on quality scores. The quality scoring method of the illustrative embodiments supports quality scoring of hierarchical matches returned from multi-step searches. For example, a high school search may be specified as a single-step search or a multi-step search.

In a single-step search, all elements are defined at once, and thus all elements and their attributes are direct components of the match, and match quality scores can be calculated by applying the calculation method described with respect to FIG. 6 through FIG. 15 without revision. In a multi-step search, the quality scores are propagated from one search to the next.

For example, suppose the high school search were broken into pieces, with a separate search for each component (classroom building, parking lot, football field, baseball field, tennis court), and then a final search combining these elements into a high school complex. For the initial individual component searches, quality scores may be calculated, and then the overall high school complex quality score may be computed by combining the individual component scores, using the method described with respect to FIG. 6 through FIG. 15.

Variations to this procedure are sometimes desirable. For example, suppose a high school requires total parking lot area to be at least 10,000 square meters. In this case, the parking lot quality of the overall high school complex should be re-computed based on the total area of all of the parking lot pieces.

This procedure may view the ensemble parking lot as an element, and apply the method of the illustrative embodiments performed in the usual way, using the ensemble area as the element attribute, as described with respect to FIG. 6 through FIG. 15.

Figure 4A:
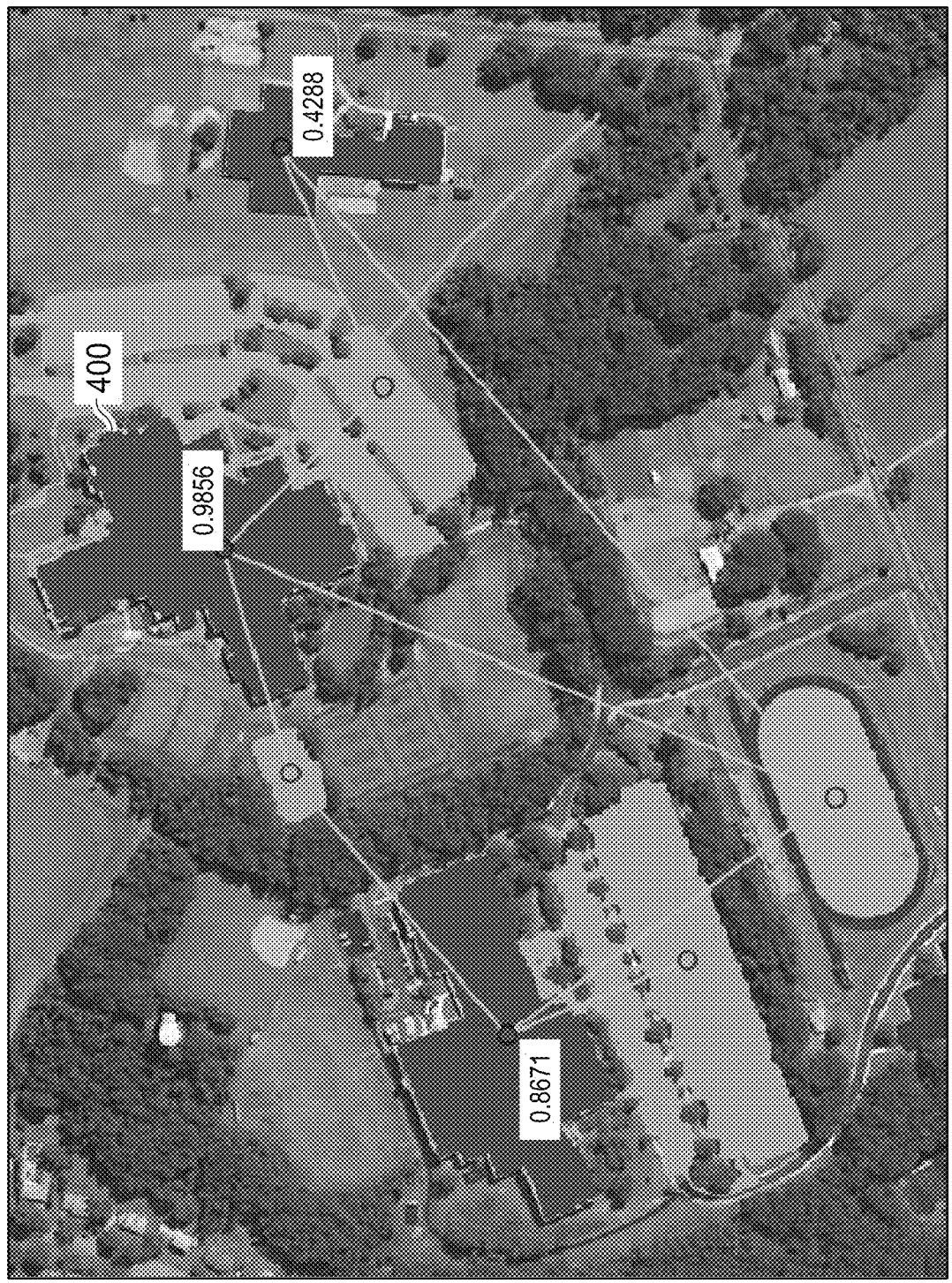
FIGS. 4A and 4B are an example of improved matches with quality distance scores in accordance with an illustrative embodiment.
Figure 4B:
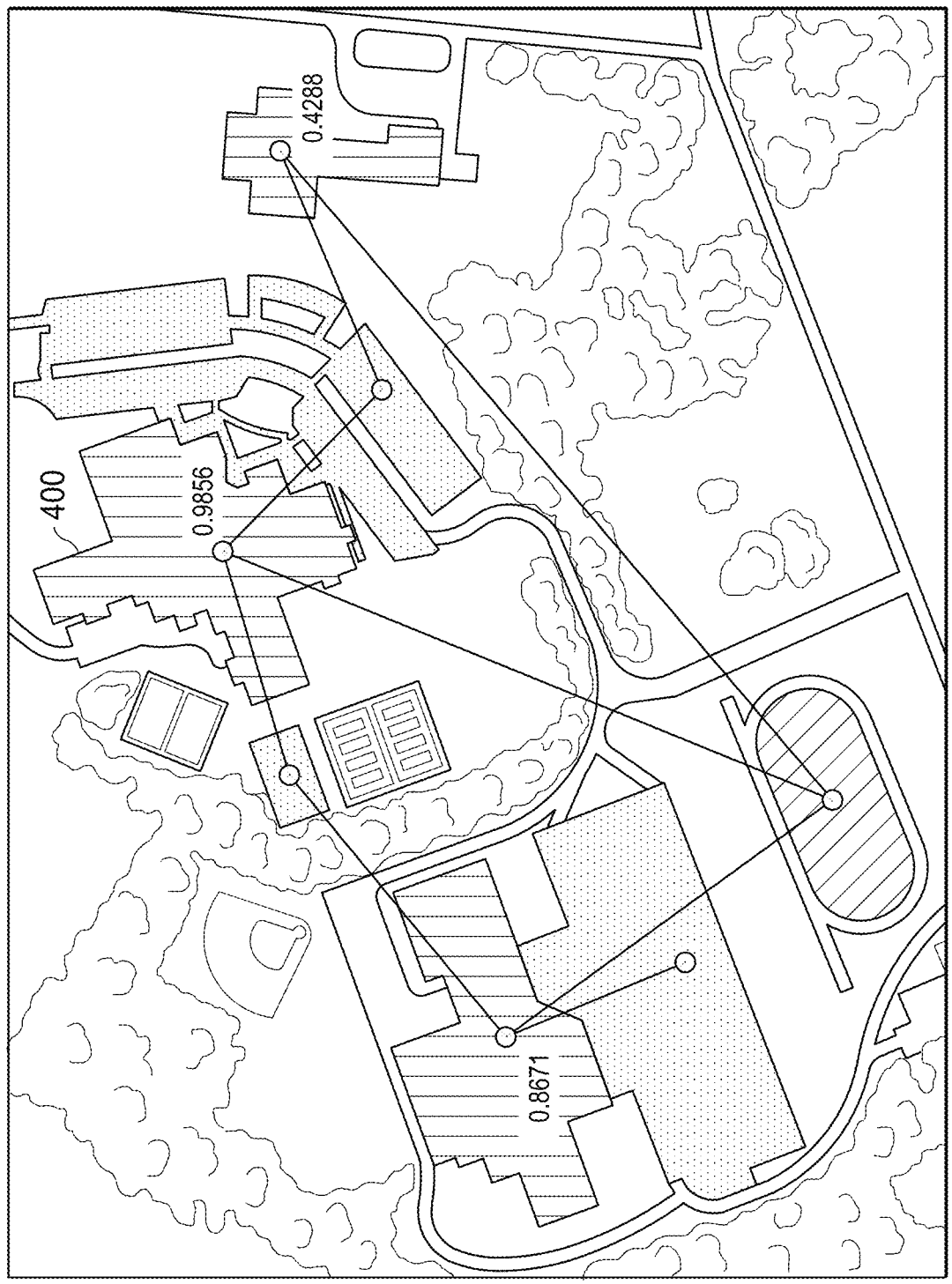

FIGS. 4A and 4B is an example of improved matches with quality scores in accordance with an illustrative embodiment. FIGS. 4A and 4B shows candidate high school 400, though candidate high school 400 need not be the same as high school 200 in FIGS. 2A and 2B. Each of these matches has an associated quality score (0.9856, 0.8671, and 0.4288 in this case), indicating how well each match fits the defined template. Note that a given match may or may not be an actual high school—a returned search result match merely indicates that the ensemble of components matches the user's specified search template, while the quality scores indicate how closely the match corresponds to the template.

Another variation is desirable for certain "grouping" searches. For example, consider the results shown in FIGS. 4A and 4B. Here, the search returned three different candidate high school matches, all in close proximity and sharing the same relative shape and position of a football field. For situations where the objective is to draw the user's attention to a given area to prompt their visual inspection, this level of evaluation is practically only one match.

To address this situation, a "grouping" search can be defined, which combines such occurrences into single matches. For these matches, the quality score should be the maximum of the group elements (0.9856 in this case).

The method can be extended to return not only a quality score for each match, but also an interval characterizing the potential variation in match quality. This extended method is performed by identifying error distributions associated with each attribute, and then performing Monte Carlo simulation over these distributions to characterize the variation in quality score that results from the aggregate input error distribution. See the description with respect to FIG. 5 through FIG. 7 for details.

Figure 5:
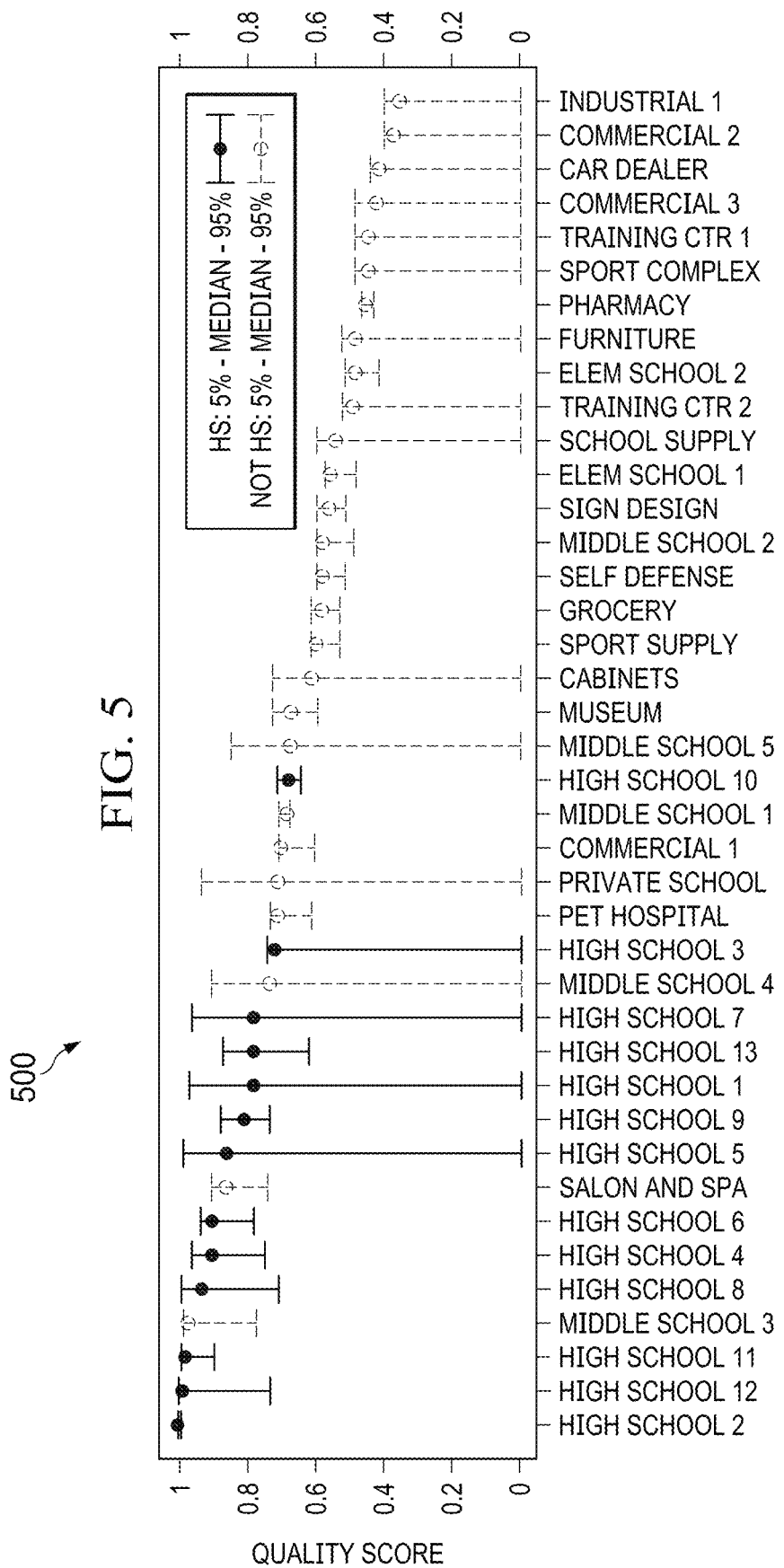
FIG. 5 is a plot of median value and estimated variation in quality score for an example search, in accordance with an illustrative embodiment.

FIG. 5 is a plot of median value and estimated variation in quality score for an example search, in accordance with an illustrative embodiment. Plot 500 may show results of performing a method of the illustrative embodiments, such as method 100 of FIG. 1.

Plot 500 shows an example calculation result. It is possible to also extend the quality score method to include weights that emphasize some template elements more heavily than others. This extended method would be accomplished by defining a set of weight coefficients that reflect user preference and then using them in the appropriate summation equations described with respect to FIG. 6 through FIG. 15.

FIG. 5 indicates along the horizontal axis matches found that match a search template for a high school, such as the example shown in FIGS. 4A and 4B. Along the vertical axis is shown a quality score, where a "1" indicates a perfect match to the template. As shown in plot 500, "High School 2" has the highest quality match, with other matches arranged in decreasing quality scores. Manual post-match analysis determined whether each returned match included a high school (HS) or was something else. In plot 500, true high schools are shown with solid lines and/or solid circles, while matches that are not high schools are shown with dashed lines and/or open circles. Thus, a user may quickly review plot 500 and determine the matches which best match the user's defined high school search template. The illustrative embodiments described above are exemplary only. While the illustrative embodiments described above relate to using a computer to determine a distance-based confidence score from an image to determine how well it matches an input template, many other applications are possible. For example, the illustrative embodiments may be used in a variety of applications to identify places of interest. Many other possible applications are possible. Thus, the illustrative embodiments and the claimed inventions are not necessarily limited by the examples provided above.

Figure 6:
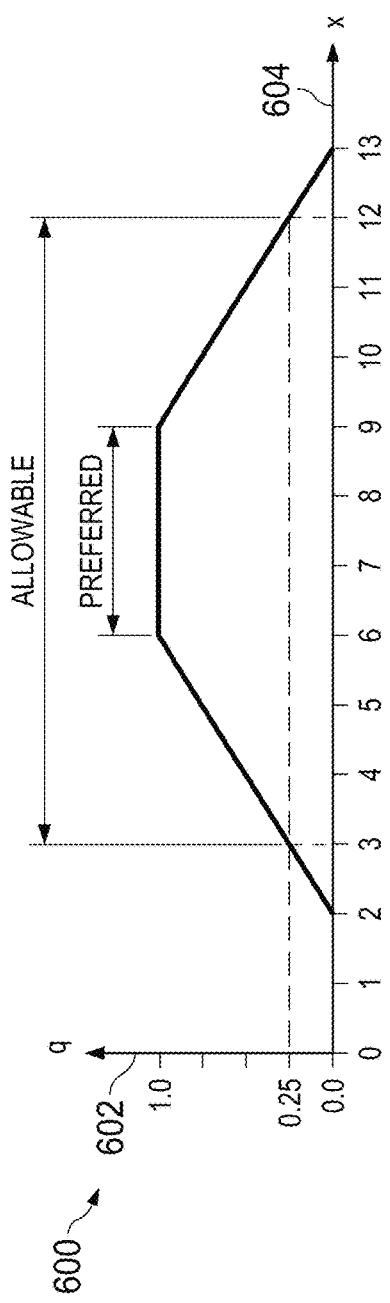
FIG. 6 is a graph indicating a trapezoidal quality score, in accordance with an illustrative embodiment.

FIG. 6 is a plot indicating a trapezoidal quality score, in accordance with an illustrative embodiment. Plot 600 may be characterized as a plot that shows quality scores for a single attribute x. Vertical axis 602 indicates quality, q. Horizontal axis 604 indicates the range of attribute values.

As mentioned above, the graph search identifies candidate matches. Then, the quality scoring techniques of the illustrative embodiments are used to rank the candidate matches, returning the best matches first in the list. The illustrative embodiments use a quality score function to accomplish this goal.

The quality score of the illustrative embodiments indicates how well a given returned subgraph corresponds to the search template. Intuitively, a match that includes all required and optional elements, and where all parameters are within the preferred range, would receive a quality score of 1.0. The quality score would decrease if optional components were missing, or if individual parameter values were outside their preferred range. As deviations from ideal accumulate, the quality score should continue to decrease at a monotonic, intuitive rate.

The user may be able to adjust the falloff in quality on a per-parameter basis, as some template parameters are more critical than others. FIG. 6 shows a trapezoidal quality score that captures this intuition. The schematic plot shows quality scores for a single attribute. A range of preferred values would receive a perfect quality score, and values fall off gracefully outside this range. Outside the wider range of allowable values, quality becomes zero.

The illustrative embodiments find similar properties for the overall match quality score. The challenge in designing a suitable quality score lies in properly combining scores across match elements and their attributes. To see why, consider the following simple example.

Imagine a search template with only one node, which has five defining attributes. Each attribute has a defined range of allowable and preferred values, analogous to the plot shown in FIG. 6. For this simple single-node search template, each match has only one node. The graph search program only returns nodes where all five of the node's attributes are within the corresponding allowable ranges. The scoring function then computes a quality score for each attribute, using the corresponding attribute quality plot.

Now that per-attribute quality scores have been calculated, these scores are combined to produce an overall node quality score. An obvious approach would be to simply average the quality scores, but this approach is flawed. To see why, consider the following two hypothetical nodes with associated attribute quality scores:

Node #1: 0.001, 1.0, 1.0, 1.0, 1.0
Node #2: 0.75, 0.75, 0.75, 0.75, 0.75

Node #1 is clearly worse, because a required attribute has a very low quality score of 0.001. While barely passing the allowable limits, this nearly unacceptable attribute should drive a very low overall node quality score. Meanwhile, Node #2 has good quality across all attributes, and should receive a good overall score.

Unfortunately, if one simply averages the attribute quality scores to obtain an aggregate node score, then Node #1 gets a higher score of 0.8002, compared to Node #2's score of 0.75. This behavior is clearly undesirable.

The problem here is that the average effectively implements the disjunction of the attribute constraints, whereas a conjunction of constraints is to be provided. If one attribute is nearly out of range, then the overall quality score should drop dramatically.

One method to compute a conjunction of individual attribute scores would be to convert each individual score into a distance, representing the distance of the attribute from preferred:

$$d_{ij} = \frac{1}{q_{ij}} - 1 \quad \text{(equation 1)}$$

where $q_{ij}$ is the quality of attribute j of node i, and $d_{ij}$ is the "q-distance" of attribute j from its preferred range for node "i" of the match. This equation is different than the complex conditional calculation described in Stracuzzi et al. One can now compute the average q-distance $D_i$ for node "i":

$$D_i = \frac{\sum_j d_{ij}}{n_i} \quad \text{(equation 2)}$$

where $n_i$ is the number of attribute constraints in the search template for node i, and $D_i$ is the q-distance for node i. This equation is quite different from the equation for the total distance for candidate I, which follows Equation 6 in Stracuzzi et al. For example, this equation splits the $D_i$ calculation on a node-by-node basis. Also, the constituent $d_{ij}$ values are computed by very different methods. Given equation 2, one can compute the quality of node i:

$$q_i = \frac{1}{1 + D_i} \quad \text{(equation 3)}$$

The node quality score $q_i$ now has the properties that are desired. For example, if all attributes have a perfect quality of 1, then $D_i$=0 and $q_i$=1. Alternatively, if all attributes have equivalent good quality of 0.75 (Node #2), then $q_i$=0.75. On the other hand, if all attributes are perfect except for one very poor attribute with quality 0.001 (Node #1), then $q_i$ 0.005, a desirable result.

This distance-based function satisfies the triangle equality: If the quality of two attributes is reduced, the overall node quality is worse than would result with either attribute alone.

Equation 3 looks similar to the in-line equation BB in Stracuzzi et al. but it is not. The reason the equations are different is because the subscript i here refers to the node within a match, whereas in Stracuzzi et al. the subscript i refers to the match within a set of matches.

The quality scoring function of the illustrative embodiments uses this to calculate a quality score for each node in a match, and then combines the node scores to produce an overall match score. If all of the nodes in the match are required (no optional nodes), then a similar procedure may be applied.

$$D_i = \frac{1}{q_i} - 1 \quad \text{(equation 4)}$$

where $q_i$ and $D_i$ are the node quality score and q-distance, respectively, for node i. For a search template composed only of the required nodes, the overall match quality is then:

$$D_{required} = \frac{\sum_{required\ i} D_i}{n_{required}} \quad \text{(equation 5)}$$

$$q_{required} = \frac{1}{1 + D_{required}} \quad \text{(equation 6)}$$

Equations 5 and 6, combined with Equation 2, compute the distance for a given match. However, this computation is different from Stracuzzi et al. because it considers only required nodes. Equations 5 and 6 split the averaging operation on a node-be-node basis instead of a single aggregate calculation, and because the underlying $d_{ij}$ values are computed quite differently.

For star graph searches, one can also include quality scores for match edges. Since each non-hub node in a star graph has exactly one edge connecting it to the hub, one can similarly compute an edge q-distance $D_{ei}$, and combine this with the non-hub node q-distance $D_{ni}$ to form an overall edge-node aggregate q-distance $D_{ni}$=$D_{ei}$)/2, after which the remainder of the computation proceeds unchanged. Stracuzzi et al. discusses computation of edge quality values, but does not present this averaging calculation.

Attention is now turned to treating the variable topology issues. These issues include optional and required elements, varying numbers of instances of elements, and the possibility that the quality among these instances may vary. None of these issues was addressed in Stracuzzi et al.

Search templates may include optional elements. A star graph search template includes parameters [$n_{min}$, $n_{max}$] specifying the minimum and maximum allowable number of each given spoke. Thus, if a spoke has [$n_{min}$, $n_{max}$]=[3,7], then three nodes are required, with up to four additional optional nodes.

The quality scoring function of the illustrative embodiments partitions the match nodes into required and optional sets, and computes corresponding $q_{required}$ and $q_{optional}$ scores for each. The $q_{required}$ computation is described above. The $q_{optional}$ score is computed as $$q_{optional} = \frac{\sum_{optional\ i} w_i q_i}{\sum_{optional\ i} w_i} \quad \text{(equation 7)}$$

where $w_i$ is a weighting factor that allows the user to indicate that some optional elements are more important than others. This arrangement also allows specification of negative weights, indicating undesirable node types. This degree of control can be ignored by setting all $w_i$ values to 1.

For a template with optional nodes, the overall match quality is $$q_{match} = (w_{required} q_{required}) + q_{required}[(1-w_{required}) q_{optional}] \quad \text{(equation 8)}$$

where $w_{required}$ is a user-specified weighting factor that indicates the relative importance of the required and optional nodes. A typical choice is to set $w_{required}$ to the percentage of required nodes in the template specification.

Note that $q_{required}$ appears twice in the Equation (8). This choice is to avoid the same sort of disjunction effect that led to quality reversal in the Node #1 and Node #2 example above. While it is tempting to simply convert the $q_{optional}$ score into a q-distance and apply Equations (5) and (6)

above, this would be an error because now missing optional elements would impose a severe penalty, essentially implementing an undesired conjunction effect.

In a match containing multiple instances of a given node type, the quality among nodes will generally differ. Further, our quality score allows the declaration of preferred cardinality limits to augment the $[n_{min}, n_{max}]$ allowable constraints employed by the search algorithm. To ensure reasonable behavior, all matches of a given type are sorted in order of decreasing quality, so that required nodes receive the highest scores, the early optional nodes receive the next highest, etc. In addition, the code of the illustrative embodiments allows specification of spoke ensembles whose quantity is defined by total area rather than cardinality. These capabilities add complexity to the quality scoring function. Additional details regarding this complexity are described with respect to FIG. 8 through FIG. 14, explained below.

Figure 7:
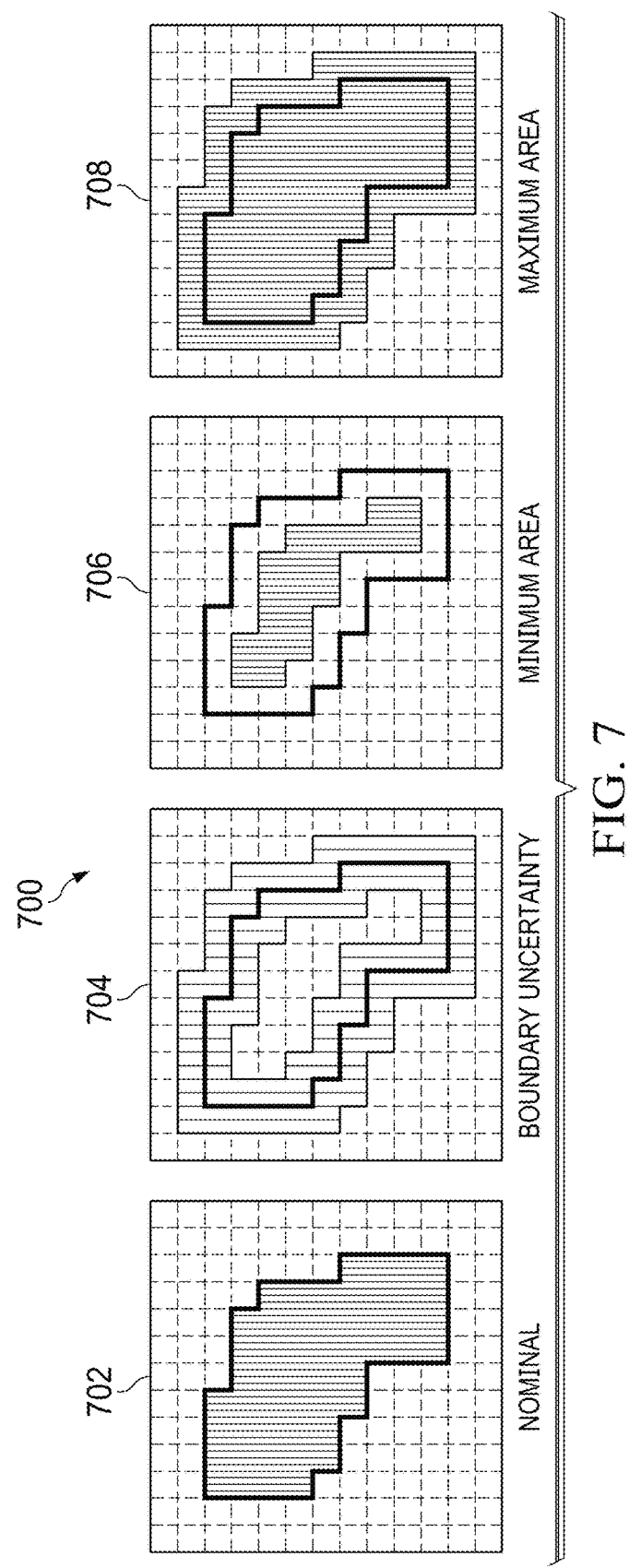
FIG. 7 is a series of graphs showing definition of a model of the uncertainty in region shape, in accordance with an illustrative embodiment.

FIG. 7 is a series of pixel images showing definition of a model of the uncertainty in region shape, in accordance with an illustrative embodiment. The series of images may be referred to as series 700. Image 702 shows a nominal region shape. This shape is a nominal measurement of an actual shape in the world; this measurement is subject to error. Image 704 shows boundary uncertainty in region shape; this boundary uncertainty characterizes the possible variation in the shape, given measurement uncertainty. Image 706 shows the shape that has the minimum area, consistent with the uncertainty. Image 708 shows the shape with maximum area consistent with the uncertainty.

The quality scoring function of the illustrative embodiments also provides an estimate of the robustness of the quality score. This estimate of robustness is accomplished by defining a simple model of the uncertainty in region shape, as shown in FIG. 7. These uncertainty limits are then used to construct estimated normal distributions in attribute parameters such as region area, perimeter, and region-to-region distance. These distribution estimates take into account the region shapes. The distributions are then used in a Monte Carlo simulation to generate alternative instances of regions consistent with the error model, and a quality score is computed for each. This result, in turn, produces an estimated distribution of quality scores, which is returned for user study.

Attention is now turned to FIG. 8 through FIG. 14, which should be read together in context. In particular, FIG. 8 through FIG. 14 and the text below describe how one can calculate quality scores for matches that contain multiple elements of a given node type. The information presented with respect to FIG. 8 through FIG. 14 is not discussed in the Stracuzzi et al. paper.

Some matches have multiple copies of elements. For example, a match might have four instances of element X, each with different per-element quality scores. Further, the template may express preferences for the group, for example stating that there must be at least two but no more than six instances, with three to five instances preferred, or that the total area of all elements in the group is preferred within certain area bounds. The illustrative embodiments provide specific techniques for calculating scores for such cases.

First, the notion of an "optional element group" is introduced. This optional element group is a set of elements of type X that are in excess of the minimum required number. For example, if the search template specifies that the number of X elements must be in the range $[n_{min}, n_{max}]=[2, 6]$, then the first two instances of X are strictly required, and thus not in the optional element group. Thus, the optional element group might contain anywhere from zero to four copies of item X. When one considers equation (7) that computes the optional quality score, one can replace the notion of a single "optional element" with an "optional element group." That is, the entire set of optional copies of element X would enter into equation (7) just once, instead of once per instance of X.

Note that this approach is in contrast to the required calculation equation (6); in this equation, individual copies of X are counted separately. The illustrative embodiments prioritize the required elements by sorting all copies of X in order of decreasing quality (increasing d), and applying the highest-quality elements to the required slots, and leaving the remainder for the optional slots.

So, given a set of remaining optional instances, one question is how to compute the quality of the optional element group. This question is answered below. There are two cases: One can express preferences either based on the number of elements, or based on their total area.

FIG. 8 is a plot illustrating a cardinality quality specification, in accordance with an illustrative embodiment. Plot 800 includes vertical axis 802, which refers to the quality score, and horizontal axis 804, which refers to the number of instances of that score.

Referring to the first of the two cases mentioned just above, first consider preferences expressed in terms of the number of element instances. For example, suppose the template limits the number of element X instances to $[n_{min}, n_{max}]=[3, 12]$, while we especially prefer the number of instances to be in $[n_{preferred.min}, n_{preferred.max}]=[6, 9]$. The resulting quality specification plot would then be FIG. 8.

Intuitively, what this plot says is that for this particular search, the best matches have 6-9 instances of element X. If there are fewer (say, 4), then it is a possible match, but not as good. In other words, additional instances of X beyond the minimum of 3 provide reinforcing evidence supporting a match.

On the other hand, too many instances of X reduce the credibility of the match. As the number of instances of X grows beyond 9, additional instances of X actually provide contradictory evidence, cancelling the increase in quality suggested by the earlier instances.

For a match that contains some number $n_x$ instances, first observe that the first three instances are required, and thus do not contribute to $q_{optional}$. Further, if a candidate match has fewer than three instances of X, it is simply not returned by the search algorithm.

Now suppose that a fourth instance is present. If it is a perfect instance, the question becomes what should be taken as the optional element group quality score $q_{optionalX}$. For the moment, assume all elements are perfect. In this case, one can look up a $q_{optionalX}$ from the specification plot. If there are four instances of element X, then we obtain FIG. 9 for $n_x=4$, $q_{optionalX}=0.33$ FIG. 9 is a plot illustrating a cardinality quality lookup, in accordance with an illustrative embodiment. Plot 900 includes vertical axis 902, which refers to the quality score, and horizontal axis 904, which refers to the number of instances of that score.

Continuing from the example begun in FIG. 8, If all elements have perfect per-element quality, then $q_{optionalX}$ in each case would correspond to the value of the curve in the specification plot. One can make this concrete in a table relating $n_x$ and $q_{optionalX}$, which is shown in FIG. 10.

FIG. 10 is a table illustrating a relation of values of $n_x$ versus $q_{optionalX}$, in accordance with an illustrative embodiment. Table 1000 has the desired properties. If $n_x \in [4,5]$, then $q_{optionalX} < 1.0$, rising as $n_x$ increases. If $n_x$ is in the range

[6, 9], then $q_{optionalX}$ has maximum value of 1.0. If $n_x>9$, then $q_{optionalX}$ ramps down, reaching a minimum of zero for $n_x=12$.

This procedure is straightforward if all elements are of perfect quality. However, generally not all elements are of perfect quality. For example, suppose there are 12 instances of item X, with the following per-instance quality scores:

1, 1, 1, 1, 1, 1, 1, 1, 1, 0.01, 0.01, 0.01

The first nine instances have perfect quality scores, but the last three have very low scores.

Intuitively, the question becomes, "how would we assess such a match?" Since $n_x=12$, a simple plot lookup would yield a $q_{optionalX}$ value of zero, but this seems incorrect, because what results are nine excellent instances providing positive evidence of the match, and three very marginal instances that enter the realm of negative contradictory evidence. Since the three final instances are of such poor quality, they should have a diminished ability to reduce the group element quality $q_{optionalX}$.

This result is in contrast to the case where all 12 elements have perfect quality, in which case the contradictory evidence of the final three instances would fully cancel the positive supporting evidence of the earlier instances. Therefore, to differentiate between these two scenarios, one includes the quality of individual instances to compute $q_{optionalX}$.

One can approach this by computing the quality score for each instance, sorting in order of decreasing quality, and then progressively analyzing this list from beginning to end, accumulating the $q_{optionalX}$ score. The contribution of each instance to the final value will be a combination of the instance score and also its place in the sequence. In other words, the $q_{optionalX}$ score is a weighted sum of the optional instance quality scores, as defined by the following equation:

$$q_{optionalX} = \Sigma_{optional\ j} w_j q_j \quad \text{(equation 9)}$$

where the instance weights $w_j$ are computed from the quality specification plot. Continuing the above example, the $w_j$ values are given in FIG. 11.

FIG. 11 is a table illustrating a relation of values of $n_x$ versus $q_{optionalX}$ with weights $w_j$, in accordance with an illustrative embodiment. Table 1100 shows the $w_j$ values required by Equation (9).

To see why the $w_j$ values are correct, imagine a scenario where each element is perfect, and one progressively adds X instances. The first three instances are required, and do not participate in a $q_{optionalX}$. Calculation begins with the fourth element; $q_{optionalX}$ starts at 0.33. Adding the fifth grows $q_{optionalX}$ to 0.67. Adding a sixth grows $q_{optionalX}$ to 1.0. Adding an element leaves $q_{optionalX}$ at 1.0.

This unchanged value is desirable, because the horizontal plateau of the quality specification plot indicates that $q_{optionalX}$ should be 1.0 for perfect sets of size 6 through 9, with no differentiation between these cases. Adding a tenth reduces $q_{optionalX}$ because the tenth instance of X enters the realm of contradictory evidence. This reduction continues with the addition of the 11th and 12th instances, reaching an ultimate value of $q_{optionalX}=0$ as desired. No 13th instance will appear, because the search algorithm returns no matches with over 12 nodes.

If one imagines repeating this calculation with varying per-instance quality scores, each additional instance will update the overall $q_{optionalX}$ score based on the individual instance score and its position in the sequence. This update has the desired effect of modulating the impact on $q_{optionalX}$ according to the credibility of each instance.

One can calculate the required weights $w_j$ directly from the quality specification plot. If $q_{plot}(j)$ is the function shown in the plot, then value of each weight is $$w_j = q_{plot}(j) - q_{plot}(j-1) \quad \text{(equation 10)}$$

This result allows one to directly and simply calculate all of the required weights $w_j$, given the intuitive input of the quality specification plot.

Now compute $q_{optionalX}$ a for the example above. Recall that the quality specification plot is available (see FIG. 9), as are the following per-instance quality scores:

1, 1, 1, 1, 1, 1, 1, 1, 1, 0.01, 0.01, 0.01 where the first three scores are for required elements which do not participate in $q_{optionalX}$. For the given quality specification plot, the weights $w_j$ are shown in table 1100 of FIG. 11. Thus, one computes $q_{optionalX}$:

$$q_{optionalX} = (0.33 \times 1) + (0.34 \times 1) + (0.33 \times 1) + (0 \times 1) + (0 \times 1) + (0 \times 1) + (-0.33 \times 0.01) + (-0.34 \times 0.01) + (-0.33 \times 0.01); \text{ or}$$

$$q_{optionalX} = 0.99.$$

The contradictory evidence resulting from elements 10-12 are muted by their low quality scores, resulting in a high $q_{optionalX}$ value, as desired.

Figure 12:
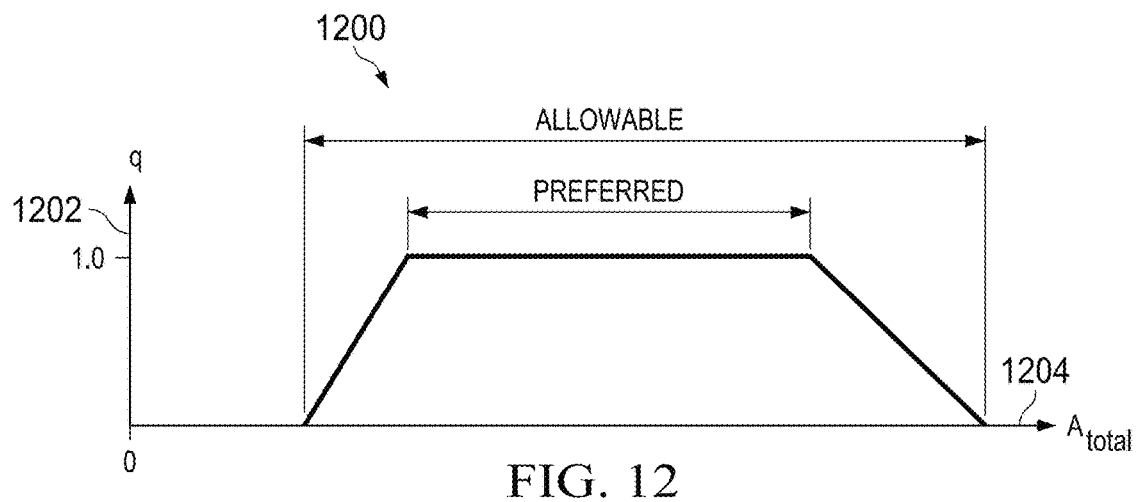
FIG. 12 is a graph illustrating a schematic total area quality specification, in accordance with an illustrative embodiment.
Figure 13:
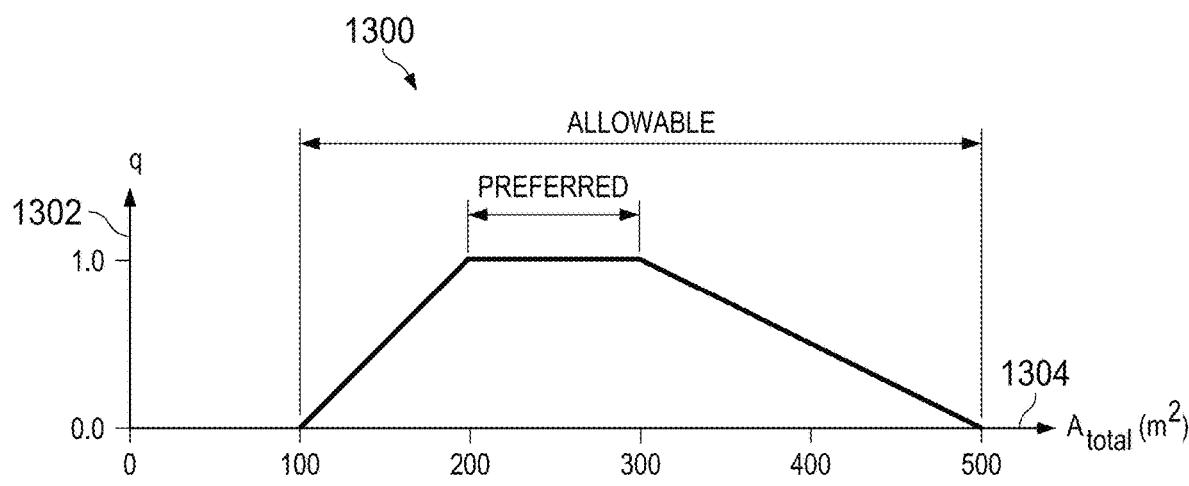
FIG. 13 is a graph illustrating an example total area specification, in accordance with an illustrative embodiment.
Figure 14:
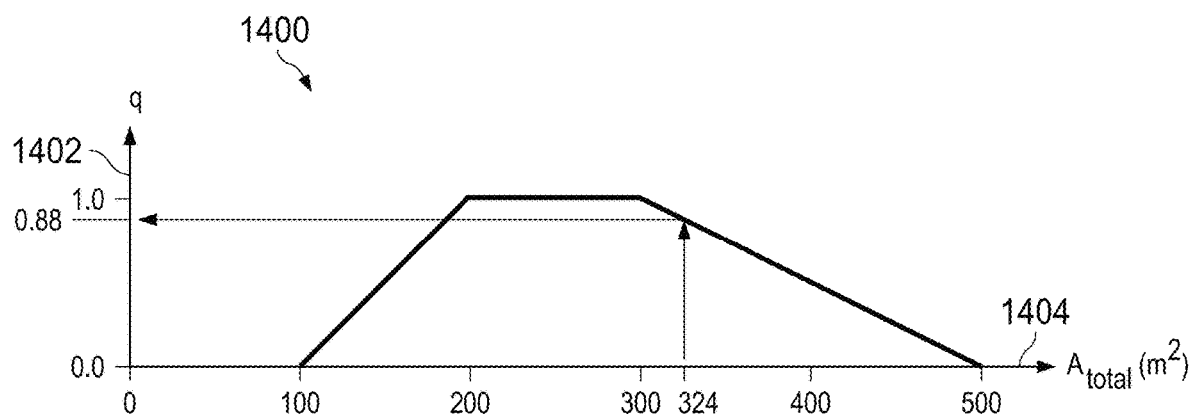
FIG. 14 is a graph of total area quality lookup, in accordance with an illustrative embodiment.

FIG. 12 through FIG. 14 should be considered together. These figures are used to describe group quality based on total area.

FIG. 12 is a plot illustrating a schematic total area quality specification, in accordance with an illustrative embodiment. Plot 1200 may be characterized as a schematic plot that shows total area quality specification. Vertical axis 1202 indicates quality, q. Horizontal axis 1204 indicates the total area.

The total preference is expressed as a plot of quality score as a function of total area, as shown in FIG. 12. Here, one assumes that all matches returned by the search algorithm satisfy the minimum total area. Under this view, the minimum total area is a required property of the match.

To compute the quality for the element group, one separates the area into required and optional components, and apply the appropriate calculation to each component. As with the cardinality-based method, the illustrative embodiments first score each instance, and sort the instances in order of decreasing quality.

For example, suppose the search template specifies that the total area of all instances of element X must be in the range [100 m$^2$, 500 m$^2$], with the preferred range [200 m$^2$, 300 m$^2$]. The corresponding quality specification plot would be FIG. 13.

FIG. 13 is a plot illustrating an example total area specification, in accordance with an illustrative embodiment. Plot 1300 may be characterized as a plot that shows total area specification. Vertical axis 1302 indicates quality, q. Horizontal axis 1304 indicates the total area, in square meters.

Now consider a match with five instances of element X, with the following per-element areas:

55 m$^2$, 70 m$^2$, 32 m$^2$, 91 m$^2$, 67 m$^2$

These values are shown in order of decreasing quality, not area. Thus, the 55 m$^2$ instance has the highest per-element quality score, and the 67 m$^2$ instance has the lowest quality score. Here are their corresponding quality distance $d_i$ values:

1.7, 3.1, 6.5, 8.2, 9.3

The search template requires 100 m$^2$ minimum total area, so all of the first instance is required, and 45 m$^2$ (64%) of the second instance is required. These values are used to compute the area-weighted average quality distance for the required component:

$$d_{1+partial2}=[55\ m^2 \times 1.7)+(45\ m^2 \times 3.1)]/(55\ m^2+45\ m^2)=2.33.$$

Now compute $q_{required}$ using Equation (6). Assuming that there are three other required elements U, V, and W which are all perfect, this result would be:

$$q_{required}=1/[1+(0+0+0+2.33)/4]=0.632$$

Next one computes $q_{optional}$, in several steps. The first step is to compute the total area of all the elements of type X:

$$A_{Total}=55\ m^2+70\ m^2+32\ m^2+100\ m^2+67\ m^2=324\ m^2$$

This result allows one to look up the quality scaling factor from the quality specification plot shown in FIG. 14.

FIG. 14 is a plot of total area quality lookup, in accordance with an illustrative embodiment. Plot 1400 may be characterized as a plot that shows total area quality lookup. Vertical axis 1402 indicates quality, q. Horizontal axis 1404 indicates the total area, in square meters.

The lookup step returns a quality scaling factor of 0.88. However, the area-weighted average quality score is of interest, so one can first convert the q-distance values for each instance to a corresponding quality score, using Equation (3), as follows:

$$q_1=1/(1+1.7)=0.370$$

$$q_2=1/(1+3.1)=0.244$$

$$q_3=1/(1+6.5)=0.133$$

$$q_4=1/(1+8.2)=0.109$$

$$q_5=1/(1+9.3)=0.097$$

Next, one computes the area-weighted average quality score, excluding the first 100 m² because it has already been included in $q_{required}$:

$$q_{avgX}=[(25\ m^2 \times 0.244)+(32\ m^2 \times 0.133)+(100\ m^2 \times 0.109)+(67\ m^2 \times 0.097)]/(25\ m^2+32\ m^2+100\ m^2+67\ m^2)$$

$$q_{avg1X}=0.124$$

Note that the first term is the portion of instance 2 that is not required. Further, instance 1 was not included at all.

Next, one can obtain $q_{optionalX}$ by scaling this by the factor from the quality specification plot, as follows:

$$q_{optionalX}=0.88 \times 0.124=0.109$$

Finally, the overall match quality score can be computed. The illustrative embodiments contemplate choosing $w_{required}$. One can observe that element X has both required and optional elements. Thus one can view the original list of four element types U, V, W, and X as five types U, V, W, $X_{required}$, and $X_{optional}$. Four of these are required, so $w_{required}=0.8$ is chosen. Using this value, what is obtained is:

$$q_{match}=(0.8 \times 0.632)+\{0.632 \times [0.2 \times 0.109]\}=0.506+0.014=0.520$$

In this example, the presence of the optional instances of element X increases the overall match quality by less than 3%. This seems reasonable, since the required elements, including the first two X instances, are such a significant part of this match.

Figure 15:
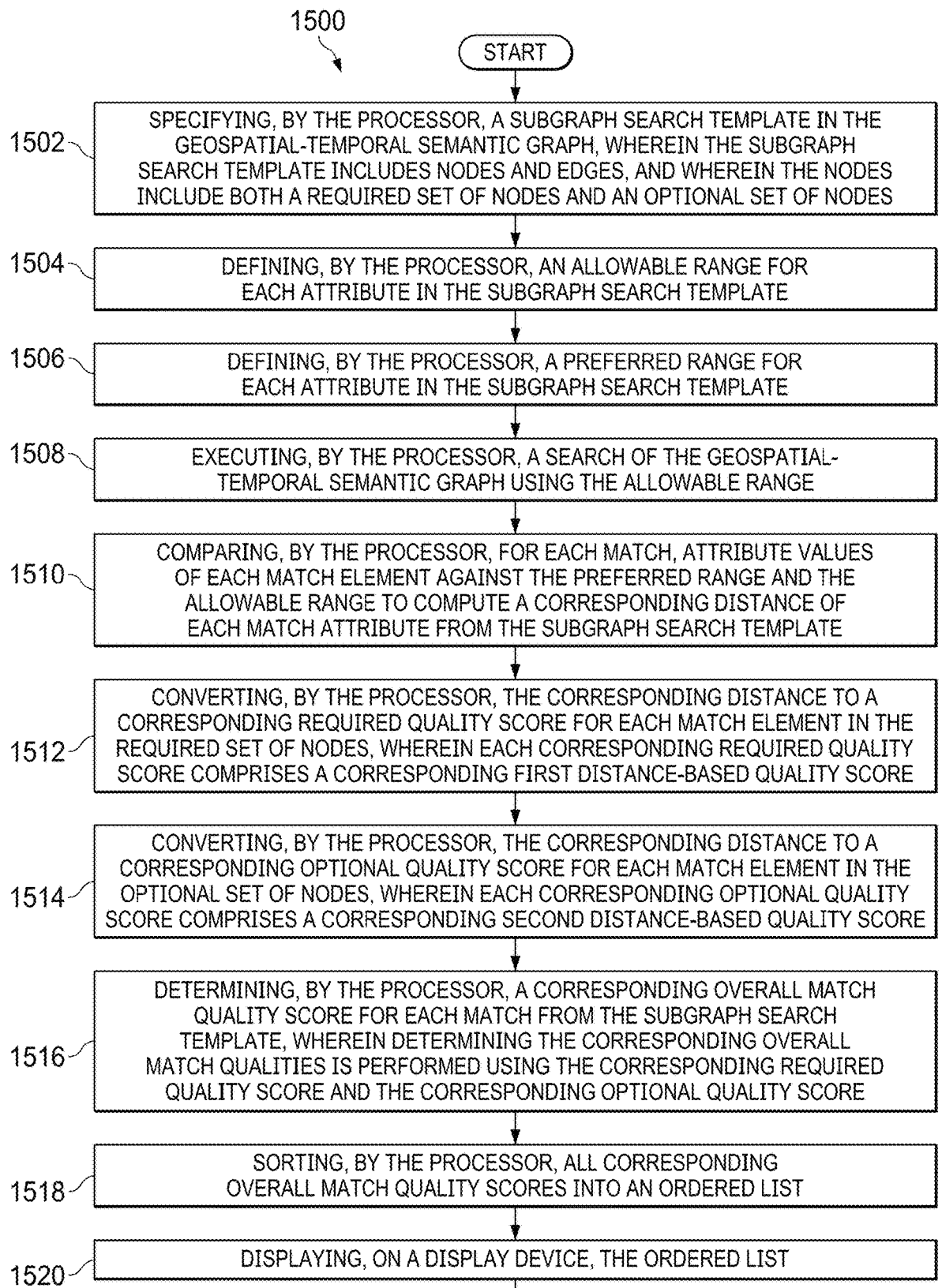
FIG. 15 is an example of a flowchart of a method of performing distance-based quality scores in a geospatial temporal graph in accordance with an illustrative embodiment.

FIG. 15 is an example of a flowchart of a method of performing distance-based quality scores in a geospatial temporal graph in accordance with an illustrative embodiment. FIG. 15 may be a variation of method 100 shown in FIG. 1. Method 1500 may be implemented using a data processing system, such as data processing system 1600 of FIG. 16.

Method 1500 may be characterized as a computer-implemented method of improving processing of overhead image data by a processor using a distance-based quality score in a geospatial-temporal semantic graph. Method 1500 includes specifying, by the processor, a subgraph search template in the geospatial-temporal semantic graph, wherein the subgraph search template includes nodes and edges, and wherein the nodes include both a required set of nodes and an optional set of nodes (operation 1502). Method 1500 also includes defining, by the processor, an allowable range for each attribute in the subgraph search template (operation 1504). Method 1500 also includes defining, by the processor, a preferred range for each attribute in the subgraph search template (operation 1506).

Method 1500 also includes executing, by the processor, a search of the geospatial-temporal semantic graph using the allowable range (operation 1508). Method 1500 also includes comparing, by the processor, for each match, attribute values of each match element against the preferred range and the allowable range to compute a corresponding distance of each match attribute from the subgraph search template (operation 1510).

Method 1500 also includes converting, by the processor, the corresponding distance to a corresponding required quality score for each match element in the required set of nodes, wherein each corresponding required quality score comprises a corresponding first distance-based quality score (operation 1512). Method 1500 also includes converting, by the processor, the corresponding distance to a corresponding optional quality score for each match element in the optional set of nodes, wherein each corresponding optional quality score comprises a corresponding second distance-based quality score (operation 1514).

Method 1500 also includes determining, by the processor, a corresponding overall match quality score for each match from the subgraph search template, wherein determining the corresponding overall match qualities is performed using the corresponding required quality score and the corresponding optional quality score (operation 1516). Method 1500 also includes sorting, by the processor, all corresponding overall match quality scores into an ordered list (operation 1518). Method 1500 also includes displaying, on a display device, the ordered list (operation 1520).

Method 1500 may be varied. For example, determining the corresponding overall match quality score may be performed using an equation defined as:

$$q_{match}=(w_{required}q_{required})+q_{required}[(1-w_{required})q_{optional}]$$

where $W_{required}$ is a user specified weighting factor that indicates a relative importance of the required set of nodes and the optional set of nodes, where $q_{required}$ is the corresponding required quality score, and where $q_{optional}$ is the corresponding optional quality score.

In another illustrative embodiment, method 1500 may also include augmenting allowable constraints employed by the search by declaring preferred cardinality limits; and using these limits to compute the required quality score and optional quality score. In still another illustrative embodiment, method 1500 may also include sorting match nodes of a given type in order of decreasing quality, such that required nodes receive the highest scores, and the early optional nodes receive the next highest scores.

In yet another illustrative embodiment, method 1500 may also include defining spoke ensembles in an image from which the required and optional quality scores are computed based on total area rather than by cardinality. In still another illustrative embodiment, method 1500 may also include identifying, by the processor, an object of interest by selecting an object having a highest overall quality score on the ordered list.

In another illustrative embodiment, method 1500 may also include rejecting, from the ordered list, match elements that have overall quality scores below a threshold. In still another illustrative embodiment, method 1500 may also include using different allowable range limits to control execution of the search, where the different allowable range limits to control search are a narrower subset of the allowable limits used in calculating the quality score.

In yet another illustrative embodiment, a given quality score is defined by the equation: quality=1/(1+distance). In still another illustrative embodiment, method 1500 may also include estimating a quality variation range associated with each corresponding quality score.

Still other variations are possible. Thus, the claimed inventions and the other illustrative embodiments described herein are not necessarily limited to these examples.

Figure 16:
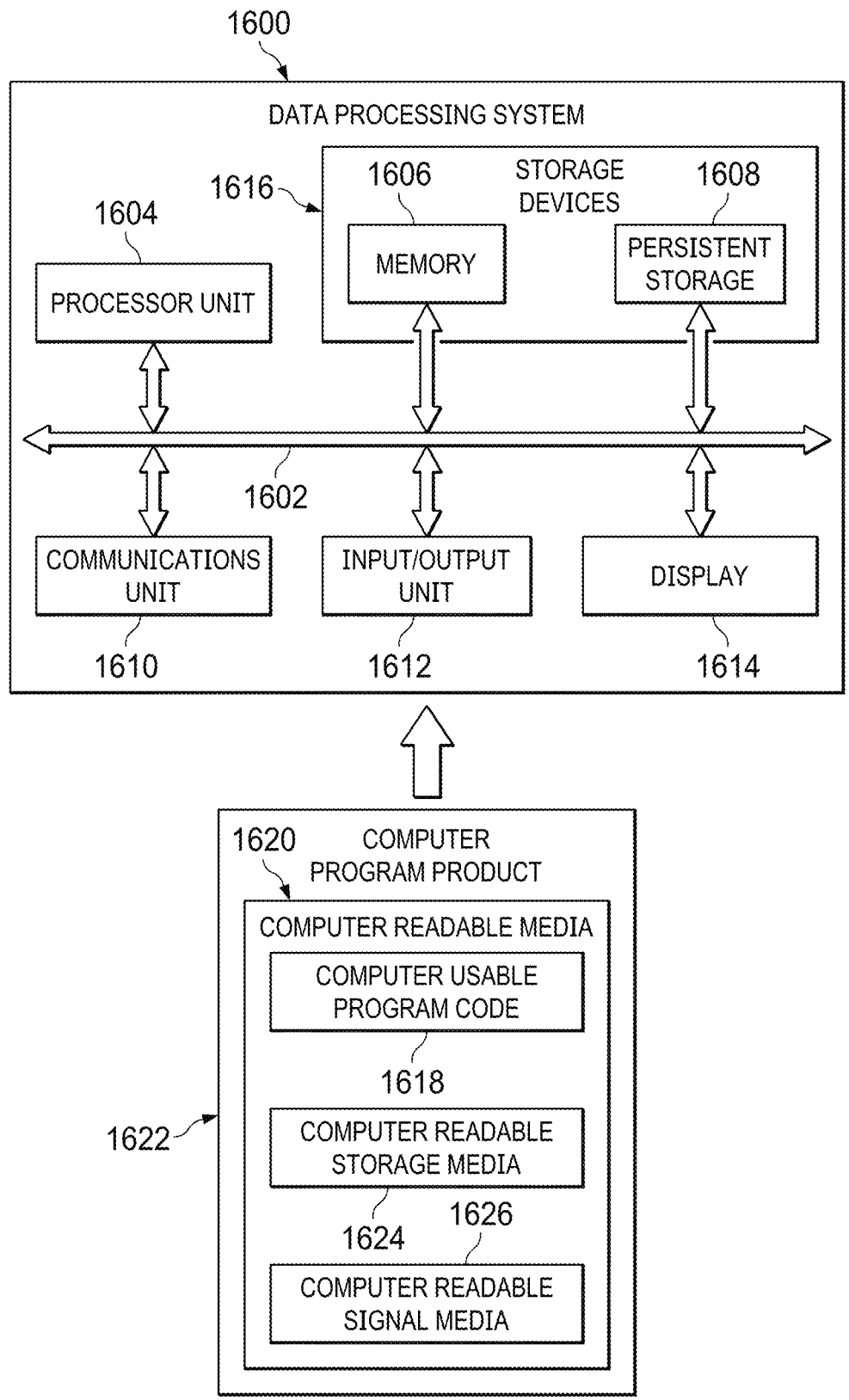
FIG. 16 illustrates a data processing system, in accordance with an illustrative embodiment.

Turning now to FIG. 16, an illustration of a data processing system is depicted in accordance with an illustrative embodiment. Data processing system 1600 in FIG. 16 is an example of a data processing system that may be used to implement the illustrative embodiments, such as those described with respect to FIG. 1 through FIG. 15. In this illustrative example, data processing system 1600 includes communications fabric 1602, which provides communications between processor unit 1604, memory 1606, persistent storage 1608, communications unit 1610, input/output (I/O) unit 1612, and display 1614.

Processor unit 1604 serves to execute instructions for software that may be loaded into memory 1606. This software may be an associative memory, content addressable memory, or software for implementing the processes described elsewhere herein. Thus, for example, software loaded into memory 1606 may be software for executing method 100 of FIG. 1, method 1500 of FIG. 15, or for other methods described herein.

Processor unit 1604 may be a number of processors, a multi-processor core, or some other type of processor, depending on the particular implementation. A number, as used herein with reference to an item, means one or more items. Further, processor unit 1604 may be implemented using a number of heterogeneous processor systems in which a main processor is present with secondary processors on a single chip. As another illustrative example, processor unit 1604 may be a symmetric multi-processor system containing multiple processors of the same type.

Memory 1606 and persistent storage 1608 are examples of storage devices 1616. A storage device is any piece of hardware that is capable of storing information, such as, for example, without limitation, data, program code in functional form, and/or other suitable information either on a temporary basis and/or a permanent basis. Storage devices 1616 may also be referred to as computer readable storage devices in these examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these examples, provides for communications with other data processing systems or devices. In these examples, communications unit 1610 is a network interface card. Communications unit 1610 may provide communications through the use of either or both physical and wireless communications links.

Input/output (I/O) unit 1612 allows for input and output of data with other devices that may be connected to data processing system 1600. For example, input/output (I/O) unit 1612 may provide a connection for user input through a keyboard, a mouse, and/or some other suitable input device. Further, input/output (I/O) unit 1612 may send output to a printer. Display 1614 provides a mechanism to display information to a user.

Instructions for the operating system, applications, and/or programs may be located in storage devices 1616, which are in communication with processor unit 1604 through communications fabric 1602. In these illustrative examples, the instructions are in a functional form on persistent storage 1608. These instructions may be loaded into memory 1606 for execution by processor unit 1604. The processes of the different embodiments may be performed by processor unit 1604 using computer implemented instructions, which may be located in a memory, such as memory 1606.

These instructions are referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these examples. In one example, computer readable media 1620 may be computer readable storage media 1624 or computer readable signal media 1626. Computer readable storage media 1624 may include, for example, an optical or magnetic disk that is inserted or placed into a drive or other device that is part of persistent storage 1608 for transfer onto a storage device, such as a hard drive, that is part of persistent storage 1608. Computer readable storage media 1624 also may take the form of a persistent storage, such as a hard drive, a thumb drive, or a flash memory, that is connected to data processing system 1600. In some instances, computer readable storage media 1624 may not be removable from data processing system 1600.

Alternatively, program code 1618 may be transferred to data processing system 1600 using computer readable signal media 1626. Computer readable signal media 1626 may be, for example, a propagated data signal containing program code 1618. For example, computer readable signal media 1626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1618 may be downloaded over a network to persistent storage 1608 from another device or data processing system through computer readable signal media 1626 for use within data processing system 1600. For instance, program code stored in a computer readable storage medium in a server data processing system may be downloaded over a network from the server to data processing system 1600. The data processing system providing program code 1618 may be a server computer, a client computer, or some other device capable of storing and transmitting program code 1618.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1604 may take the form of a hardware unit that has circuits that are manufactured or configured for a particular use. This type of hardware may perform operations without needing program code to be loaded into a memory from a storage device to be configured to perform the operations.

For example, when processor unit 1604 takes the form of a hardware unit, processor unit 1604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1618 may be omitted because the processes for the different embodiments are implemented in a hardware unit.

In still another illustrative example, processor unit 1604 may be implemented using a combination of processors found in computers and hardware units. Processor unit 1604 may have a number of hardware units and a number of processors that are configured to run program code 1618. With this depicted example, some of the processes may be implemented in the number of hardware units, while other processes may be implemented in the number of processors.

As another example, a storage device in data processing system 1600 is any hardware apparatus that may store data. Memory 1606, persistent storage 1608, and computer readable media 1620 are examples of storage devices in a tangible form.

In another example, a bus system may be used to implement communications fabric 1602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1606, or a cache, such as found in an interface and memory controller hub that may be present in communications fabric 1602.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of improving processing of overhead image data by a processor using a distance-based quality score in a geospatial-temporal semantic graph, the computer-implemented method comprising:
specifying, by the processor, a subgraph search template in the geospatial-temporal semantic graph, wherein the subgraph search template includes nodes and edges, and wherein the nodes include both a required set of nodes and an optional set of nodes;
defining, by the processor, an allowable range for each attribute in the subgraph search template;
defining, by the processor, a preferred range for each attribute in the subgraph search template;
executing, by the processor, a search of the geospatial-temporal semantic graph using the allowable range;
comparing, by the processor, for each match, attribute values of each match element against the preferred range and the allowable range to compute a corresponding distance of each match attribute from the subgraph search template;
converting, by the processor, the corresponding distance to a corresponding required quality score for each match element in the required set of nodes, wherein each corresponding required quality score comprises a corresponding first distance-based quality score;
converting, by the processor, the corresponding distance to a corresponding optional quality score for each match element in the optional set of nodes, wherein each corresponding optional quality score comprises a corresponding second distance-based quality score;
determining, by the processor, a corresponding overall match quality score for each match from the subgraph search template, wherein determining the corresponding overall match qualities is performed using the corresponding required quality score and the corresponding optional quality score;
sorting, by the processor, all corresponding overall match quality scores into an ordered list; and
displaying, on a display device, the ordered list.

2. The computer-implemented method of claim 1 wherein determining the corresponding overall match quality score is performed using an equation defined as:

$$q_{match} = (w_{required} q_{required}) + q_{required}[(1 - w_{required}) q_{optional}]$$

where $W_{required}$ is a user specified weighting factor that indicates a relative importance of the required set of nodes and the optional set of nodes, where $q_{required}$ is the corresponding required quality score, and where $q_{optional}$ is the corresponding optional quality score.

3. The computer-implemented method of claim 1 further comprising:
augmenting allowable constraints employed by the search by declaring preferred cardinality limits; and
using these limits to compute the required quality score and optional quality score.

4. The computer-implemented method of claim 1 further comprising:
sorting match nodes of a given type in order of decreasing quality, such that required nodes receive the highest scores, and early optional nodes receive next highest scores.

5. The computer-implemented method of claim 1 further comprising:
defining spoke ensembles in an image from which the required and optional quality scores are computed based on total area rather than by cardinality.

6. The computer-implemented method of claim 1 further comprising:
identifying, by the processor, an object of interest by selecting an object having a highest overall quality score on the ordered list.

7. The computer-implemented method of claim 1 further comprising:
rejecting, from the ordered list, match elements that have overall quality scores below a threshold.

8. The computer-implemented method of claim 1 further comprising:
using different allowable range limits to control execution of the search, where the different allowable range limits to control search are a narrower subset of the allowable limits used in calculating the quality score.

9. The computer-implemented method of claim 1 wherein a given quality score is defined by: quality=1/(1+distance).

10. The computer-implemented method of claim 1 further comprising:
estimating a quality variation range associated with each corresponding quality score.

11. A computer comprising:
a processor; and
a memory connected to the processor, the memory storing computer code which, when executed by the processor, performs a computer-implemented method of improving processing of overhead image data by a processor using a distance-based quality score in a geospatial-temporal semantic graph, the computer code comprising:
computer code for specifying, by the processor, a subgraph search template in the geospatial-temporal semantic graph, wherein the subgraph search template includes nodes and edges, and wherein the nodes include both a required set of nodes and an optional set of nodes;
computer code for defining, by the processor, an allowable range for each attribute in the subgraph search template;
computer code for defining, by the processor, a preferred range for each attribute in the subgraph search template;
computer code for executing, by the processor, a search of the geospatial-temporal semantic graph using the allowable range;
computer code for comparing, by the processor, for each match, attribute values of each match element against the preferred range and the allowable range to compute a corresponding distance of each match attribute from the subgraph search template;
computer code for converting, by the processor, the corresponding distance to a corresponding required quality score for each match element in the required set of nodes, wherein each corresponding required quality score comprises a corresponding first distance-based quality score;

computer code for converting, by the processor, the corresponding distance to a corresponding optional quality score for each match element in the optional set of nodes, wherein each corresponding optional quality score comprises a corresponding second distance-based quality score;

computer code for determining, by the processor, a corresponding overall match quality score for each match from the subgraph search template, wherein determining the corresponding overall match qualities is performed using the corresponding required quality score and the corresponding optional quality score;

computer code for sorting, by the processor, all corresponding overall quality scores into an ordered list; and computer code for displaying, on a display device, the ordered list.

12. The computer of claim 11 wherein the code for determining the corresponding overall match quality score is executed using computer code defined an equation defined as:

$$q_{match} = (w_{required} q_{required}) + q_{required}[(1-w_{required}) q_{optional}]$$

where $W_{required}$ is a user specified weighting factor that indicates a relative importance of the required set of nodes and the optional set of nodes, where $g_{required}$ is the corresponding required quality score, and where $q_{optional}$ is the corresponding optional quality score.

13. The computer of claim 11 wherein the computer code further comprises:
  computer code for augmenting allowable constraints employed by the search by declaring preferred cardinality limits, and using these limits to compute the required quality score and optional quality score.

14. The computer of claim 11 wherein the computer code further comprises:
  computer code for sorting match nodes of a given type in order of decreasing quality, such that required nodes receive the highest scores, and the early optional nodes receive the next highest scores.

15. The computer of claim 11 wherein the computer code further comprises:
  computer code for defining spoke ensembles in an image from which the required and optional quality scores are computed based on total area rather than by cardinality.

16. A non-transitory computer recordable storage medium storing computer code which, when executed by a processor, performs a computer-implemented method of improving processing of image data by a processor using a distance-based quality score in a geospatial-temporal semantic graph, the computer code comprising:
  computer code for specifying, by the processor, a subgraph search template in the geospatial-temporal semantic graph, wherein the subgraph search template includes nodes and edges, and wherein the nodes include both a required set of nodes and an optional set of nodes;
  computer code for defining, by the processor, an allowable range for each attribute in the subgraph search template;
  computer code for defining, by the processor, a preferred range for each attribute in the subgraph search template;
  computer code for executing, by the processor, a search of the geospatial-temporal semantic graph using the allowable range;
  computer code for comparing, by the processor, for each match, attribute values of each match element against the preferred range and the allowable range to compute a corresponding distance of each match attribute from the subgraph search template;
  computer code for converting, by the processor, the corresponding distance to a corresponding required quality score for each match element in the required set of nodes, wherein each corresponding required quality score comprises a corresponding first distance-based quality score;
  computer code for converting, by the processor, the corresponding distance to a corresponding optional quality score for each match element in the optional set of nodes, wherein each corresponding optional quality score comprises a corresponding second distance-based quality score;
  computer code for determining, by the processor, a corresponding overall match quality score for each match from the subgraph search template, wherein determining the corresponding overall match qualities is performed using the corresponding required quality score and the corresponding optional quality score;
  computer code for sorting, by the processor, all corresponding overall quality scores into an ordered list; and
  computer code for displaying, on a display device, the ordered list.

17. The non-transitory computer recordable storage medium of claim 16 wherein the computer code for determining the corresponding overall match quality score is executed using computer code defined an equation defined as:

$$q_{match} = (w_{required} q_{required}) + q_{required}[(1-w_{required}) q_{optional}]$$

where $W_{required}$ is a user specified weighting factor that indicates a relative importance of the required set of nodes and the optional set of nodes, where $q_{required}$ is the corresponding required quality score, and where $q_{optional}$ is the corresponding optional quality score.

18. The non-transitory computer recordable storage medium of claim 16 wherein the computer code further comprises:
  computer code for augmenting allowable constraints employed by the search by declaring preferred cardinality limits, and using these limits to compute the required quality score and optional quality score.

19. The non-transitory computer recordable storage medium of claim 16 wherein the computer code further comprises:
  computer code for sorting match nodes of a given type in order of decreasing quality, such that required nodes receive the highest scores, and early optional nodes receive next highest scores.

20. The non-transitory computer recordable storage medium of claim 16 wherein the computer code further comprises:
  computer code for defining spoke ensembles in an image from which the required and optional quality scores are computed based on total area rather than by cardinality.

* * * * *